US012263610B2

(12) United States Patent
Jacobs et al.

(10) Patent No.: US 12,263,610 B2
(45) Date of Patent: Apr. 1, 2025

(54) SAFETY UTILITY BLADES, ASSEMBLIES AND METHODS OF MANUFACTURING

(71) Applicant: KLEVER KUTTER LLC, Grand Haven, MI (US)

(72) Inventors: Matthew Jacobs, Grand Haven, MI (US); Jeffrey Kempker, Muskegon, MI (US); Orville Crain, Muskegon, MI (US)

( * ) Notice: Subject to any disclaimer, the term of this patent is extended or adjusted under 35 U.S.C. 154(b) by 80 days.

(21) Appl. No.: 17/334,866

(22) Filed: May 31, 2021

(65) Prior Publication Data

US 2021/0283760 A1 Sep. 16, 2021

Related U.S. Application Data

(63) Continuation-in-part of application No. PCT/US2020/036514, filed on Jun. 6, 2020, and a continuation-in-part of application No. 16/571,126, filed on Sep. 15, 2019, now Pat. No. 11,052,552, which is a continuation-in-part of application No. 13/866,074, filed on Apr. 19, 2013, now Pat. No. 10,442,093, which is a continuation of application No. 12/620,999, filed on Nov. 18, 2009, now abandoned.

(60) Provisional application No. 63/030,593, filed on May 27, 2020, provisional application No. 61/138,262, filed on Dec. 17, 2008.

(51) Int. Cl.

| | |
|---|---|
| ***B26B 5/00*** | (2006.01) |
| ***B25F 1/02*** | (2006.01) |
| ***B25G 1/10*** | (2006.01) |
| ***B25G 3/18*** | (2006.01) |
| ***B26B 25/00*** | (2006.01) |
| ***B26B 27/00*** | (2006.01) |

(52) U.S. Cl.

CPC .................. *B26B 5/00* (2013.01); *B25F 1/02* (2013.01); *B25G 1/102* (2013.01); *B25G 3/18* (2013.01); *B26B 25/005* (2013.01); *B26B 27/005* (2013.01); *Y10T 83/04* (2015.04)

(58) Field of Classification Search

CPC .. B26B 5/00; B26B 5/005; B26B 9/00; B26B 9/02; B26B 25/005; B26B 27/005; Y10T 83/04; B25F 1/02; B25G 1/102; B25G 3/18

USPC ............ 30/314, 348, 337, 2, 164, 280, 317; 76/104.1

See application file for complete search history.

(56) References Cited

U.S. PATENT DOCUMENTS

| | | | | |
|---|---|---|---|---|
| 2,254,199 A * | 9/1941 | Baltuch | B26B 5/006 | 30/289 |
| 5,282,316 A * | 2/1994 | Anderson | B26B 5/006 | 30/294 |
| D401,492 S * | 11/1998 | Joseph, Jr. | D8/98 | |
| 5,933,918 A * | 8/1999 | Wallays | B25G 3/18 | 30/340 |
| 8,099,868 B1 * | 1/2012 | Votolato | B26B 29/02 | 30/294 |

(Continued)

*Primary Examiner* — Phong H Nguyen

(74) *Attorney, Agent, or Firm* — McCarter & English, LLP; James M. Smedley; Alex Korona

(57) ABSTRACT

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

7 Claims, 15 Drawing Sheets

(56) References Cited

U.S. PATENT DOCUMENTS

| | | | | |
|---|---|---|---|---|
| 2005/0217114 | A1* | 10/2005 | Votolato | B26B 5/00 30/2 |
| 2010/0263219 | A1* | 10/2010 | Kempker | B26B 25/005 83/13 |

* cited by examiner

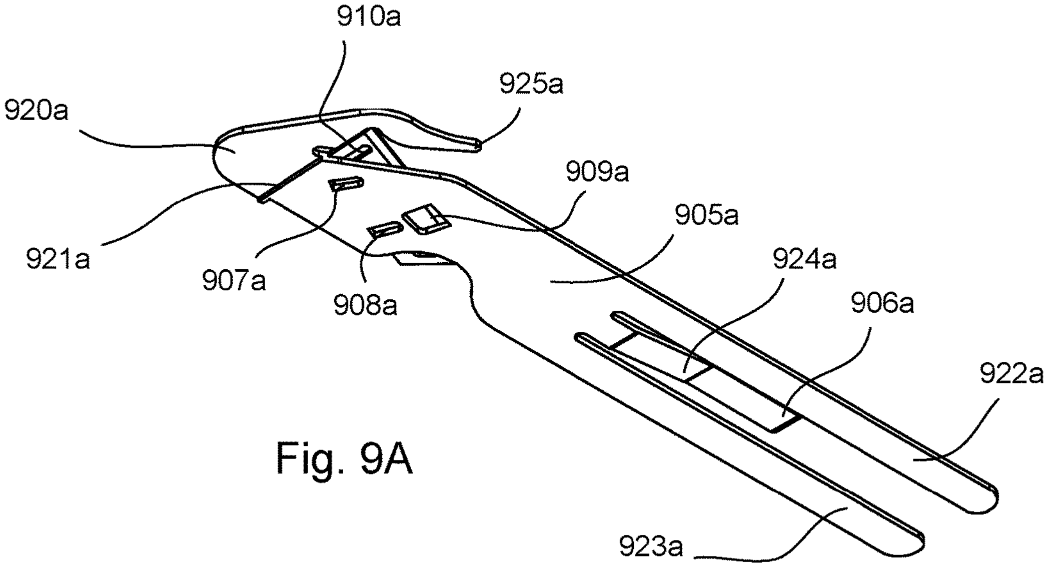
Fig. 9A
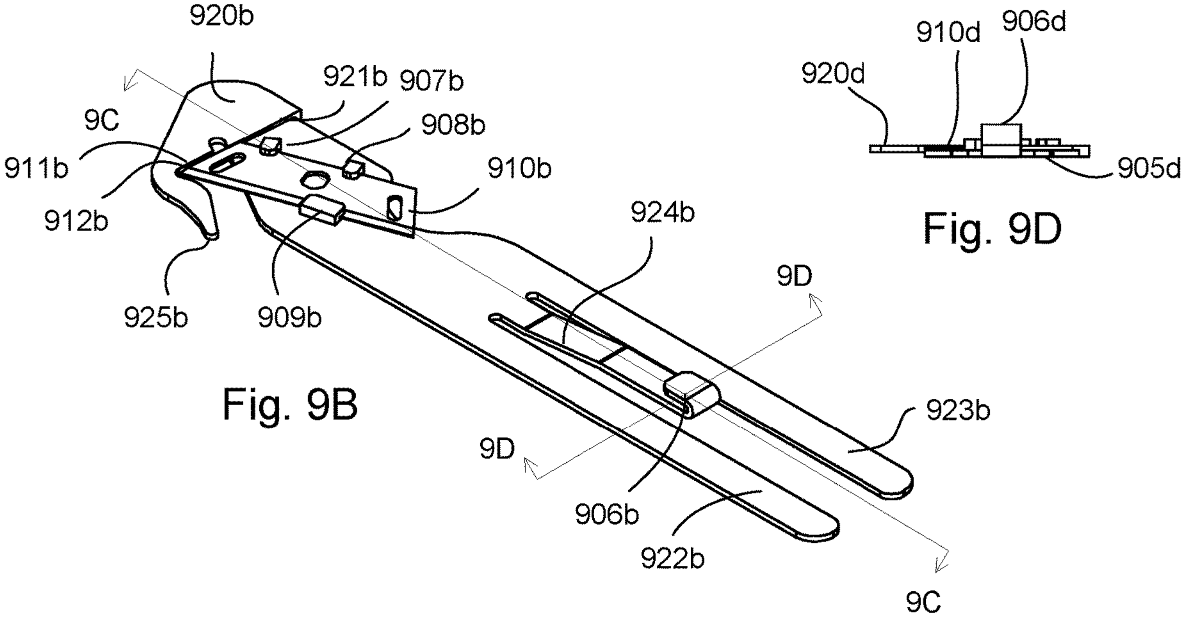
Fig. 9B
Fig. 9D
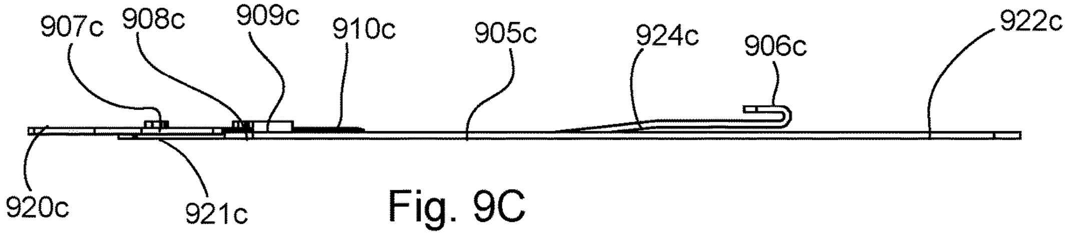
Fig. 9C

SAFETY UTILITY BLADES, ASSEMBLIES AND METHODS OF MANUFACTURING

RELATED APPLICATIONS

This application is a continuation-in-part of U.S. patent application Ser. No. 16/571,126, which was filed Sep. 15, 2019 and PCT/US20/36514, which was filed May 27, 2020, the entire disclosures of which are incorporated herein by reference. U.S. patent application Ser. No. 16/571,126 is a continuation-in-part of U.S. patent application Ser. No. 13/866,074, which was filed Apr. 19, 2013; U.S. patent application Ser. No. 13/866,074 is a continuation of U.S. patent application Ser. No. 12/620,999, which was filed on Nov. 18, 2009; U.S. patent application Ser. No. 12/620,999 claims benefit of U.S. Provisional patent application Ser. No. 61/138,262, filed Dec. 17, 2008; PCT/US20/36514 claims benefit of U.S. Provisional patent application Ser. No. 63/030,593, filed May 27, 2020; the entire disclosures of which are incorporated herein by reference.

FIELD OF THE INVENTION

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

BACKGROUND

Utility knives are used for a host of purposes, such as opening cardboard boxes, cutting sheet material, cutting web material, opening packages, etc. Injuries to the users of utility knifes are all too common due to inadvertent contact with the cutting edges of the associated blades. Injuries may be particularly severe when the given utility knife includes a razor blade.

Inadvertent contact with the cutting edges of blades can be equally common during blade removal, insertion and handling. Inadvertent contact with the cutting edges is particularly problematic when a user is removing or inserting a double edge razor blade into an associated utility knife.

As individuals become increasingly more hygiene-conscious, research has shown that nine out of ten consumers are now searching for products containing a proven and trusted antimicrobial material. Antimicrobial additives, when incorporated into plastic, may reduce bacteria by up to 99.99%, reassuring end-users that their cutter is protected and therefore less likely to harbor illness-causing bacteria. An antimicrobial material's ability to minimize microbial colonization may also reduce the potential for staining and unpleasant odors, meaning a cutter may stay fresher for longer and have an increased functional life cycle, and may offer a significant cost benefit to the consumer. For example, a silver ion antimicrobial additive may not wear off or leech from a surface of a cutter that the antimicrobial material is manufactured into, making them safe for use in a variety of products.

The global market demand for antimicrobial additives may grow significantly as a direct result of healthcare expansion in emerging countries such as China, India, Brazil, Mexico, Singapore, Saudi Arabia and Thailand. Europe may witness an increase in global volume share as a consequence of rising consumer demand for cutters that incorporate an antimicrobial material.

There may be significant rise in demand for, example, silver ion antimicrobial additives as a result of their excellent antibacterial properties, suitability for deployment in a broad range of products and low toxicological profile. Increasing awareness among consumers regarding healthcare acquired infections (HAIs) may propel the demand for cutters and cutter components containing antimicrobial additives. Demand may increase for antimicrobial materials due to their ability to increase product performance and durability.

Blades for use in utility knives, and utility knives which limit user exposure to the associated cutting edges, are desirable. Methods of manufacturing related blades and utility knives are also desirable.

Blades for use in utility knives and utility knives which limit user exposure to the associated cutting edges are desirable. Methods of manufacturing related blades and utility knives are also desirable. Cutter components are also needed that incorporate an antimicrobial material. Cutters which include components that incorporate an antimicrobial material are also needed.

SUMMARY

A safety blade for use within a utility knife includes a blade body, a blade attachment, a first blade shield and a second blade shield, wherein the blade body, the blade attachment, the first blade shield and the second blade shield compose a contiguous piece of metal. The blade attachment comprises a first inner surface and a second inner surface juxtapose on opposing edges of the blade attachment, where a thickness of the first inner surface is greater than a thickness of the first blade cutting edge and less than or substantially equal to a thickness of the blade body and a thickness of the second inner surface is greater than a thickness of the second blade cutting edge and less than or substantially equal to the thickness of the blade body. The first blade shield and the first inner surface of the blade attachment form a first blade throat which limits exposure to a first blade cutting edge, wherein the first blade shield comprises a first blunt tip having a first inner edge with a thickness that is greater than a thickness of the first blade cutting edge and less than or substantially equal to the thickness of the blade body and wherein the first inner surface of the blade attachment and the first inner edge of the first blunt tip extend beyond the first blade cutting edge. The second blade shield and the second inner surface of the blade attachment form a second blade throat which limits exposure to a second blade cutting edge, wherein the second blade shield comprises a second blunt tip having a thickness that is greater than a thickness of the second blade cutting edge and less than or substantially equal to the thickness of the blade body and wherein the second inner surface of the blade attachment and the second inner edge of the second blunt tip extend beyond the second blade cutting edge.

In another embodiment, a method of manufacturing a safety blade for use within a safety utility knife assembly includes providing a strip of blade material and forming a rough blade shape from the strip of blade material, wherein the rough blade shape comprises a blade body, a blade attachment with an inner surface and a blade shield. The method also includes forming a blade cutting edge in the rough blade shape, wherein the blade shield and the inner surface of the blade attachment form a blade throat which limits exposure to the blade cutting edge and wherein the blade shield comprises a blunt tip having an inner edge with a thickness that is greater than a thickness of the blade cutting edge and less than or substantially equal to a thickness of the blade body and wherein the inner surface of the blade attachment extends beyond a heal of the blade cutting edge and the inner edge of the blunt tip extends beyond a toe of the blade cutting edge.

In a further embodiment, a safety utility knife assembly includes a blade having a predetermined thickness and a cutting edge. The safety utility knife further includes a blade holder, wherein an operative end of the blade holder is offset from a blade holder section of the blade holder by a distance substantially equal to the predetermined thickness of the blade and wherein the operative end of the blade holder includes a blade throat that limits exposure to the cutting edge of the blade.

A safety cutter may include a blade, a blade attachment, and a handle. The blade may be attached to the handle via the blade attachment. At least one of: the blade attachment or the handle may include an antimicrobial material.

In another embodiment, a safety cutter may include a blade, a blade attachment, and a handle. The blade may be attached to the handle via the blade attachment. At least one of: the blade attachment or the handle may include an antimicrobial material incorporated within a plastic material. At least one of: the blade attachment or the handle further may include a metallic material encapsulated by the plastic material.

In a further embodiment, a safety cutter may include a blade and a blade attachment. The blade attachment may define a blade throat configured to limit access to a cutting edge of the blade. The safety cutter may also include a handle. The blade may be attached to the handle via the blade attachment. At least one of: the blade attachment or the handle may include an antimicrobial material.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE FIGURES

FIGS. 9A-9H and 9J depict an example blade carriage for use within the safety utility knife assembly of FIGS. 9A-9H and 9J;

DETAILED DESCRIPTION

Figure 1A:
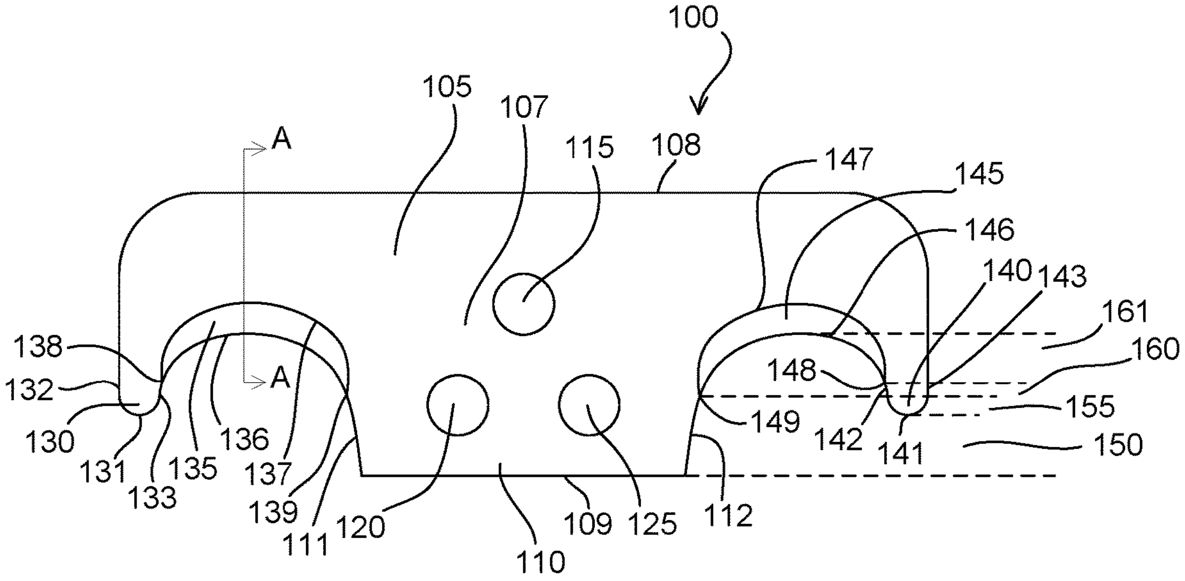
FIGS. 1*a* and 1*b* depict an example safety utility blade for use within a utility knife assembly.

The safety utility blades and safety utility knife assemblies of the present disclosure incorporate various features that limit user exposure to associated cutting edges. The manufacturing methods of the present disclosure may be used to produce the disclosed safety utility blades and safety utility knife assemblies.

The utility blades, utility cutter assemblies and components for use within the utility cutter assemblies of the present disclosure may incorporate antimicrobial materials (e.g., antimicrobial materials integrated within plastic and/or coatings with antimicrobial materials). The utility blades, utility cutter assemblies and components for use within the utility cutter assemblies of the present disclosure may incorporate various features that limit user exposure to associated cutting edges. The manufacturing methods of the present disclosure may be used to produce the disclosed utility blades, utility cutter assemblies, and components for use within the utility cutters.

A utility cutters for use in sterile environments, and/or related components thereof, are often manufactured from stainless steel. In the food industry, for example, utility cutters are often manufactured from ferrous metals such that the utility cutter and/or component thereof may be automatically detectable/removable if accidentally introduce into food production/processes. A utility cutter manufactured from a plastic with antimicrobial material and metallic particles is particularly useful for sterile environments, and food production/processing.

An antimicrobial additive (i.e., antimicrobial material) may be incorporated into, for example, a plastic during a manufacturing process (e.g., a cutter or cutter component molding process). As used herein, an antimicrobial material is defined as a material that may resist, inhibit and prevent growth of microbes including bacteria, antibiotic resistant bacteria, viruses, bacterium, protozoan, archaea, protists, prion, viroid, fungi, yeasts, algae, mold, influenza A H1N1 virus, etc. An antimicrobial material may reduce the presence of microbes. An antimicrobial material may, for example, encompass a specific antimicrobial active, such as silver ion material, a copper material, a zinc material, triclosan and/or an organic material. The antimicrobial material may be formulated into a concentrated powder, liquid suspension or master-batch pellet depending on a target material and manufacturing process. Once infused into a cutter or cutter component, an antimicrobial material may work continuously to make the cutter more hygienic, minimizing a potential for cross-contamination and extending a cutter's functional lifetime.

There are four mains types of antimicrobial materials that are based on silver ion, copper, zinc and organic technologies: 1) silver ion antimicrobial materials suitable for deployment in a broad range of materials and applications, including paints, coatings, textiles, polymers, plastics, and other material types; 2) zinc antimicrobial materials as antibacterial and antifungal compounds; 3) copper antimicrobial materials may provide antimicrobial protection in hygienic applications, with substrates such as paints, coatings, plastics, and polymers; and 4) organic antimicrobial materials including phenolic biocides, quaternary ammonium compounds (QAC or QUAT) and fungicides (Thiabendazole). Antimicrobial material may be effective against a wide spectrum of microbes such as, bacteria, mold, viruses, bacteria, etc.

Antimicrobial material may be manufactured into a wide range of materials, including plastics, polymers, paints, coatings, textiles, ceramics and paper. Antimicrobial additives may be extremely diverse, and may control microbes via many different means. When used in the manufacture of cutter components and/or cutters, the antimicrobial material may create surfaces and materials inhospitable to microbes (e.g., *E. coli*, MRSA, *salmonella, campylobacter, listeria*, etc.).

A particular antimicrobial material is BioCote®, as available from BioCote Ltd., 3 Parade Court, Central Boulevard, Prologis Park, Coventry, CV6 4QL, United Kingdom. Other suitable antimicrobial materials are SANAFOR® PO-5, EBA-10, and PS-10, as available from Janssen Preservation and Material Protection (Janssen PMP), a division of Janssen Pharmaceutica NV, a Johnson & Johnson company, 1125 Trenton-Harbourton Rd., Titusville, NJ 08560-0200.

BioCote® antimicrobial protection may be, for example, suitable for a range of plastic and polymer materials. An associated antimicrobial protection range may include antimicrobial additives for plastics. These antimicrobial materials may be, for example, integrated into a plastic material during a manufacturing process to provide lasting protection from microbes. An additive may encompass a specific antimicrobial active, such as silver (e.g., silver ion), and may be formulated into a concentrated powder, liquid suspension or masterbatch pellet depending on the type of plastic, the manufacturing process and/or a desired end-use of an associated cutter and/or cutter component. An antimicrobial material may be, for example, incorporated into various types of plastics (e.g., acrylonitrile butadiene styrene (ABS), general purpose polystyrene (GPPS), melamine formaldehyde (MF), polycaprolactam/Nylon (PA6), Nylon 66, polyacrylamide (PARA), polybutylene terephathalate (PBT), polyether ether ketone (PEEK), polyethermide (PEI), polyethylene naphthalate (PEN), polyethylene terephythalate (PET), poly(methyl methacrylate) (PMMA), polyoxymethylene (POM), polysulfone (PDU), polytetrafluoroethylene (PTFE), styrene acrylonitrile (SAN), polystyrene butadiene styrene (SBS), urea formalydehyde (UF), epoxy, chlorinated polyethylene (CPE), ethylene propylene diene monomer (EPDM), high-density polyethylene (HPDE), low-density polyethylene (LDPE), linear low-density polyethylene (LLDPE), medium-density polyethylene (MDPE), poluchloroprene/neoprene (PCP), ethylene vinyl acetate (EVA), high impact polystyrene (HIPS), polyethylene (PE), polymethyl methacrylate (PMMA), polypropylene (PP), polyurethane (PU), polycarbonate (PC), polystyrene (PS), polyvinyl chloride (PVC), silicone, thermoplastic polyurethane (TPU), etc.).

Notably, resin types, for manufacturer of any given component, as described herein, may include any one of the variations of polyethylene and polypropylene. A resin may be include within the meaning of the word "polyolefin". Polystyrene, ABS, GPPS, PVC, etc. may fall under the category of "commodity thermoplastics" (this includes polyolefins). PC, PBT, TPU, nylon, POM, etc. may be considered "engineering thermoplastics". "High temperature" may be product like polysulfone, PEI, PEEK, PPS, etc. Items like Urea, epoxy, phenolic, silicone may be considered 'thermosets'. Any given component may be manufactured of any one of the families of plastic: 1) Commodity TP, 2) Engineering TP, 3) High Heat TP, and/or 4) Thermosets. TPE, for example, may apply to several types and chemistries; TPE may be considered to be commodity or engineering depending the type and manufacturing or commercial pursuits of the product.

SANAFOR® PO-5 may be incorporated into, for example, Linear Low Density Polyethylene (LLDPE), Low Density Polyethylene (LDPE), High Density Polyethylene (HDPE), Polypropylene (PP-copolymer), Polypropylene (PP-homopolymer), Ethylene Vinyl Acetate (EVA) Copolymer, Ethylene Butyl Acrylate (EBA), Thermoplastic Elastomer (TPE), etc. SANAFOR® EBA-10 may be incorporated into, for example, Polyethylene (PE), Polypropylene (PP), Polyacrylate (PA), Polystyrene (PS), Polycarbonate (PC), Polyethylene Terephthalate (PET), Polybutylene Terephthalate (PBT), Polyvinyl Chloride (PVC), Acrylonitrile Butadiene Styrene (ABS) Poly, etc.

SANAFOR® PS-10 may be incorporated into, for example, General Purpose Polystyrene (GPPS), High Impact Polystyrene (HIPS), Poly(Styrene Acrylonitrile) (SAN), Poly(Styrene Butadiene Styrene) (SBS), Methyl methacrylate-acrylonitrile-butadiene-styrene (MABS), and Acrylic Styrene Acrylonitrile (ASA) Poly.

Alternatively, or additionally, an antimicrobial material may be as available from Microban International, Ltd., 11400 Vanstory Drive, Huntersville, NC 28078. An antimicrobial material may provide lasting and effective protection against harmful bacteria, mold, fungi and viruses by up to 99.99%, minimizing risk of staining, bad odors and material degradation. Once infused into a plastic, a silver ion antimicrobial additive may, for example, not leech from an associated surface, cause discoloration or affect the clarity of the associated plastic. An antimicrobial plastic material may last for an expected lifetime of an associated cutter and/or cutter component.

An antimicrobial material may control and/or reduce microbe presence on a protected surface. For example, an antimicrobial material, incorporated within a cutter or cutter component, may perform across a wide range of microbes (e.g., bacteria, antibiotic resistant bacteria, viruses, fungi, yeasts, algae, mold, etc.). An antimicrobial material may reduce antibiotic resistant bacteria (e.g., CRE *Klebsiella* kleb-zee-el-uh, ESBL producing *Escherichia coli*, MRSA, Methicillin-resistant *Staphylococcus aureus*, VRE, etc.). An antimicrobial material may reduce bacteria (e.g., *Acinetobacter Baumannii* As-sin-ee-toe-bac-ter, bau-mahn-ee-eye, *Campylobacter* cam-py-lo-back-ter, *Chelatococcus asaccharovorans*, etc.). An antimicrobial material may reduce mold and fungi (e.g., *Aspergillus niger* (as-per-jil-uh s nahy-jer), *Candida albicans* (kan-di-duh al-bee-cans), *Penicillium* sp. (pen-uh-sil-ee-uh m), etc.).

An antimicrobial material may contain a fine particle size (e.g., a silver based antimicrobial powder dispersed in thermoplastic carriers). Master-batch pellets may be, for example, designed to be let down at 4 wt. % Let Down Ratio (LDR) into various resins to impart antimicrobial properties to an associated cutter component or cutter. Master-batch products may be selected based on pairing a compatibility of the master-batch carrier with a resin that the master-batch is being let down into. For example, an antimicrobial powder may be custom compounding into a thermoplastic carrier resin of choice.

Antimicrobial master-batch pellets may be physically mixed with, for example, a desired thermoplastic resins at 4 wt. % prior to drying. The mixed pellets may then be dried at a maximum temperature of, for example, 180° F. to moisture levels of less than 0.05 wt. % for PEBA or polyamides, or less than 0.02 wt. % for TPU resins. Polyether block amide (PEBA) is a thermoplastic elastomer (TPE). Thermoplastic polyurethane (TPU) is any of a class of polyurethane plastics with many properties, including elasticity, transparency, and resistance to oil, grease and abrasion. Technically, thermoplastic polyurethane (TPU) are thermoplastic elastomers consisting of linear segmented block copolymers composed of hard and soft segments. Alternatively, master-batch pellets may be dried separately and mixed afterwards. For materials that are very sensitive to hydrolytic degradation, dried mixtures of pellets may be transferred directly from an associated dryer to a hopper feeder with a blanket of inert gas during processing. A 4 wt. % addition of an antimicrobial master-batch to bulk resin may not significantly influence associated plastic processing parameters. For example, associated processors start with nominal processing conditions for the selected material. However, subtle adjustments, such as increasing back pressure in an injection molding process, may achieve homogenous incorporation of an antimicrobial master-batch into a bulk resin. Similarly, cooling at an associated feed-port may prevent occurrence of bridging. A silver ion based antimicrobial material may not, use any nanoparticles, and may, for example, use a 4% let down ration in an ethylene methyl acrylate (EMA) based resin copolymer.

Figure 1B:
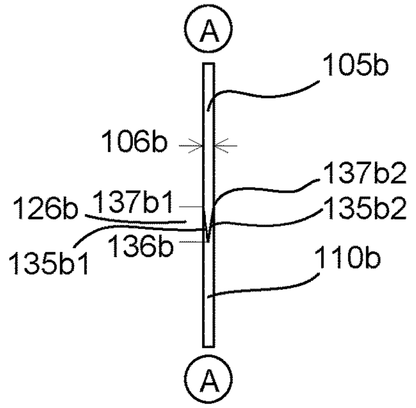

With initial reference to FIGS. 1A and 1B, a safety utility blade 100 may have a body 105 formed from a relatively thin and substantially flat material 107, such as ceramic, heat treated carbon steel, ceramic coated steel, stainless steel, Teflon coated material, etc. For example, the material 107 may be approximately 0.025 inches thick 106*b*. A blade blank (e.g. blade blank 300*a*, 400*a*, 1000*a*, 1000*b* of FIGS. 3A, 4A, 10A and 10B, respectively) may be 1.0964567 inches from a first end 132 to a second end 142 and 0.3917323 inches from a top side 108 to a bottom side 109. The safety utility blade may include blade securing holes 115, 120, 125 which may be approximately 0.0984252 inches in diameter. As described herein the blade securing holes 115, 120, 125 may, at least in part, secure a safety utility blade 100 to a safety utility knife cutting head (e.g., safety utility knife cutting head 500*a* of FIG. 5A or 500*b* of FIG. 5B). The safety utility blade 100 may be formed from a suitable material 107 for retaining a sharpened edge 136, 137, and, when that material 107 is metal, the body 105 preferably has a thickness 106*b* of at least 0.0156 inches and preferably not greater than about 0.0313 inches. What might be characterized as a "heavy-duty" safety utility blade 100 is approximately 0.025 inches thick, and the thickness 106*b* for what might be characterized as a "regular duty" safety utility blade 100 is approximately 0.017 inches. The sharpened portion 135, 145 is approximately 0.0492 inches high. A center of the first blade securing hole 115 may be approximately 0.23622 inches from the bottom side 109 and approximately 0.54825 inches from the first end 132. A center of the second blade securing hole 120 may be approximately 0.07874 inches from the bottom side 109 and approximately 0.449825 inches from the first end 132. A center of the third blade securing hole 125 may be approximately 0.07874 inches from the bottom side 109 and approximately 0.449825 inches from the second end 142. The sharpened portion 135, 145 may be coated with a material, such as paint, that may wear away as the associated safety utility blade 100 is being used to indicate whether the safety utility blade 100 has been used. The consistency of the material, such as paint, may be selected such that the amount of wear of the material is indicative of the amount of use of and/or the sharpness of the safety utility blade 100.

With further reference to FIGS. 1A and 1B, the safety utility blade 100 may include a body portion 105, 105*b* and a blade attachment portion 110, 110*b*. The first sharpened portion 135 of the safety utility blade 100 may include a first shoulder 137, a first cutting edge 136, a first heal 139 and a first toe 138. The blade attachment portion 110, 110*b* may include a first edge 111 extending from the first heal 139 to the bottom side 109. The safety utility blade 100 may further include a first blade shield 130 having a first blunt tip 131 having a radius approximately 0.03937 inches and a thickness that is greater than the first sharpened portion 135 and less than or equal to the thickness 106*b* of the body 105. The first blade shield 130 may include a first inner edge 133 that extends from the first toe 139 to the first blunt tip 131 and may have a thickness that is greater than the first sharpened portion 135 and less than or equal to the thickness 106*b* of the body 105, 105*b*. A first distance 126*b* between the first shoulder 137 and the first cutting edge 136 may be approximately 0.04921 inches.

With further reference to FIGS. 1A and 1B, the safety utility blade 100 may include a second sharpened portion 145 which may include a second shoulder 147, a second cutting edge 146, a second heal 149 and a second toe 148. The blade attachment portion 110, 110*b* may include a second edge 112 extending from the second heal 149 to the bottom side 109. The safety utility blade 100 may further include a second blade shield 140 having a second blunt tip 141 having a radius approximately 0.03937 inches and a thickness that is greater than the second sharpened portion 145 and less than or equal to the thickness 106*b* of the body 105. The second blade shield 140 may include a second inner edge 143 that extends from the second toe 149 to the second blunt tip 141 and may have a thickness that is greater than the second sharpened portion 145 and less than or equal to the thickness 106*b* of the body 105. A second distance 150 between the bottom side 109 and the second blunt tip 141 may be approximately 0.05315 inches. A third distance 155 between the bottom side 109 and the second heal 149 may be approximately 0.0687 inches. A fourth distance 160 between the bottom side 109 and the second toe 148 may be approximately 0.0774 inches. A fifth distance 161 between the bottom side 109 and the second cutting edge 146 may be approximately 0.1496 inches. As depicted in FIG. 1*b*, the cutting edge 136*b* may be defined by a third sharpened portion 135*b*1 extending from a third shoulder 137*b*1 and a fourth sharpened portion 135*b*2 extending from a fourth shoulder 137*b*2. It should be understood that either of the cutting edges 136, 146 may be formed similar to cutting edge 136*b*. The sharpened portion 135, 145, the third sharpened portion 135*b*1 and/or the fourth sharpened portion 135*b*2 may be substantially concave or convex shaped.

Alternatively, a portion of the sharpened portion 135, 145, a portion of the third sharpened portion **135*b*1 and/or a portion of the fourth sharpened portion 135*b*2** may be substantially concave or convex shaped with the remainder defining a linear shape.

Figure 2:
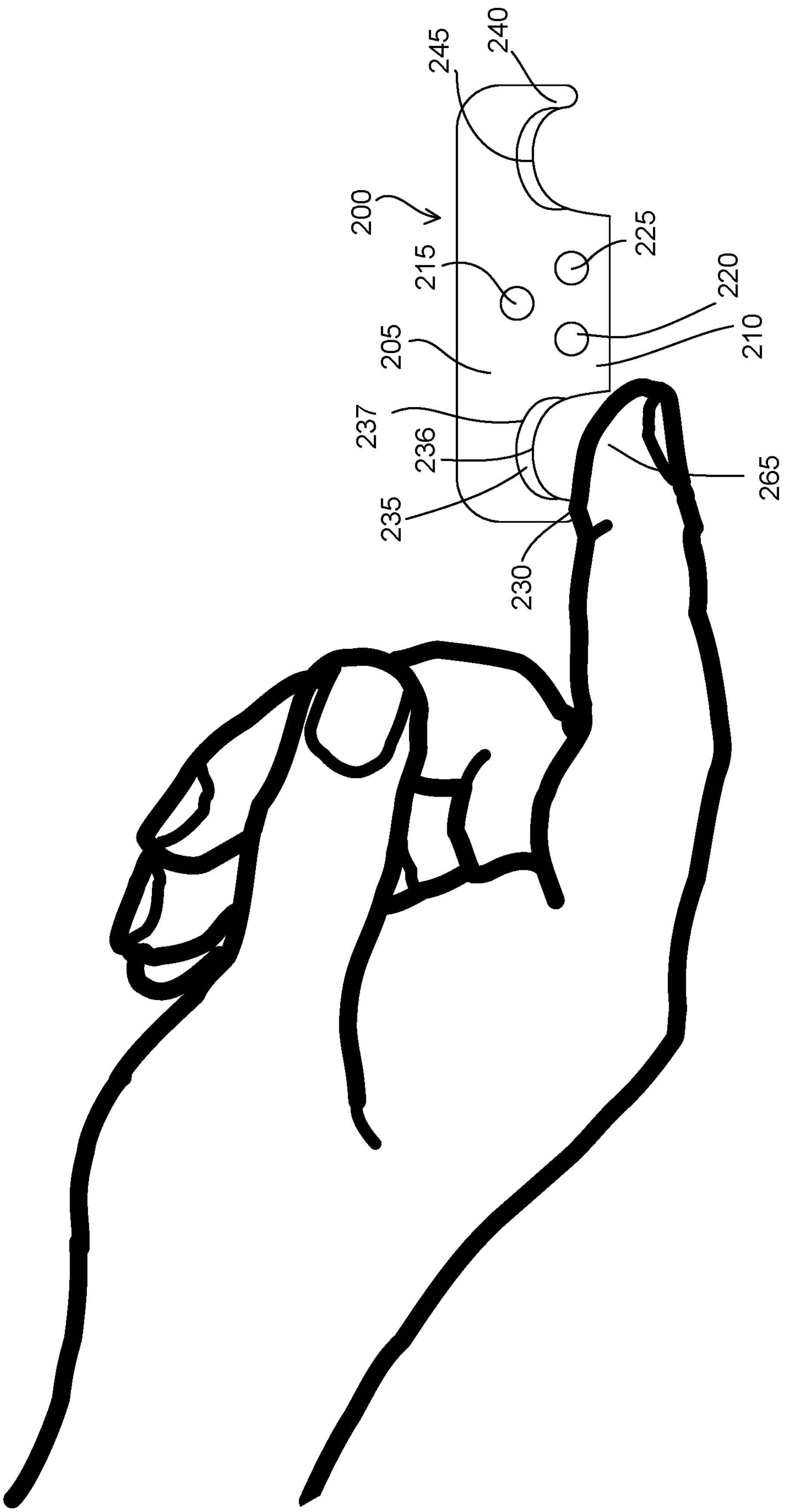
FIG. 2 depicts the safety utility blade of FIGS. 1*a* and 1*b* in proximity to a human finger.

Turning to FIG. 2, a safety utility blade 200 is depicted proximate a human finger 265. The safety utility blade 200 may be similar to the safety utility blade 100 of FIGS. 1A and 1B having a first sharpened portion 235 defining a first shoulder 237 and a first cutting edge 236. As can be seen in FIG. 2, a first blade shield 230 may cooperate with the blade attachment portion 210 to limit access of the human finger 265 to the first cutting edge 236. Similarly, the second blade shield 240 may cooperate with the blade attachment portion 210 to limit access to the second sharpened portion 245. In either event, the safety utility blade 200 may be configured to limit access to associated cutting edges while the safety utility blade is being removed from an associated package, being inserted in a corresponding safety utility knife assembly (e.g., safety utility knife assembly 700 of FIG. 7), when being removed from a corresponding safety utility knife assembly and while being used within a corresponding safety utility knife assembly. The safety utility blade 200 may have a body portion 205 constructed similar to the body portion 105. The safety utility blade 200 may include blade securing holes 215, 220, 225 for securing the safety utility blade 200 to a corresponding safety cutting head (e.g., either safety cutting head **500*a* or 500*b* of FIGS. 5A and 5B, respectively) or securing the safety utility blade to a handle (e.g., a handle 685 of FIG. 6**).

Figure 3A:
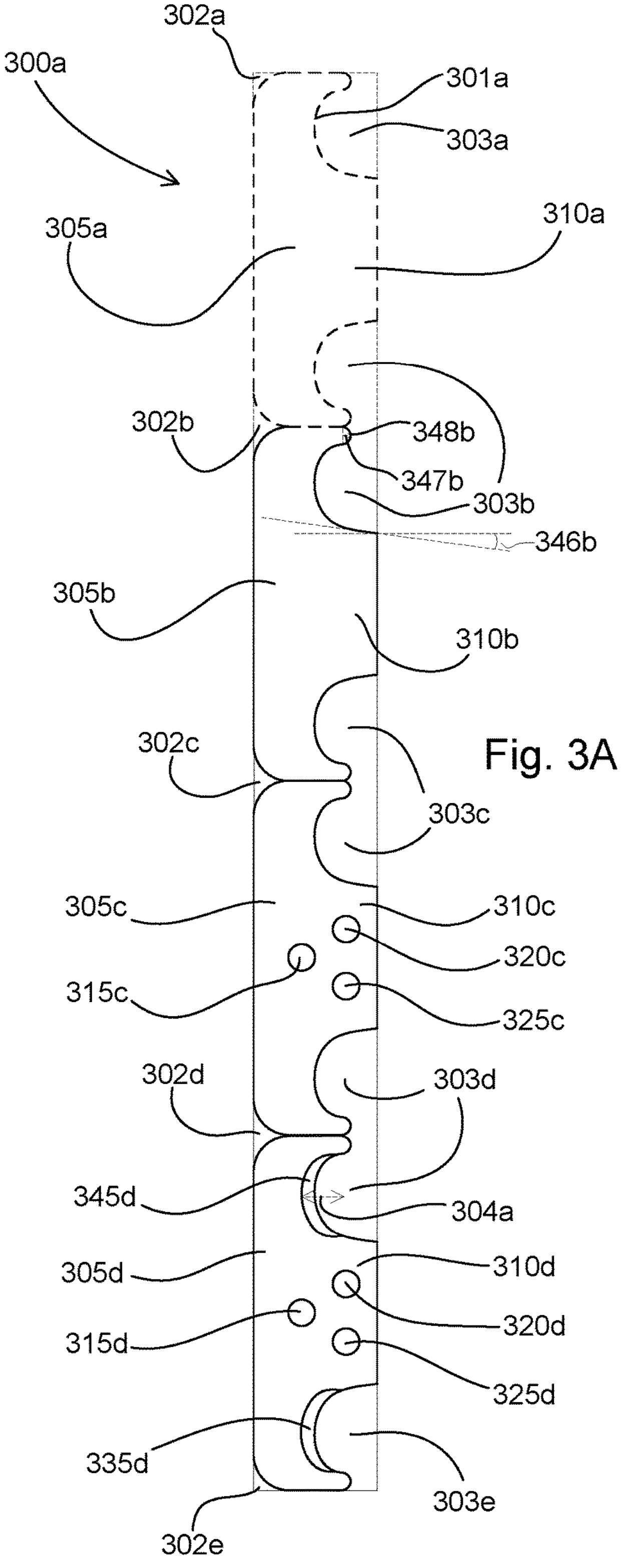
FIG. 3A depicts an example progression of manufacturing the safety utility blade of FIGS. 1*a*, 1*b* and 2.

With reference now to FIGS. 3A-3D, a method **300*d* of manufacturing a safety utility blade (e.g., safety utility blade 100 of FIG. 1) is described. A strip of blade material 300*a* is provided (block 370*d*). The individual rough blade shapes 301*a* may remain attached to one another while each of the individual steps 375*d*-385*d* are performed. A rough blade shape 301*a* is formed in the strip of blade material 300*a* (block 375*d*) by removing material 302*a*, 303*a*, 302*b*, 303*b*. The material 302*a*, 303*a*, 302*b*, 303*b* may be removed from the strip of blade material 300*a* by laser cutting, machining, water jet cutting, stamp shearing or any other suitable technique. The material 302*c*, 303*c*, 302*d*, 303*d*, 302*e*, 303*e* may be removed prior to steps 380*d*, 385*d* being performed or the steps 380*d*, 385*d* may be performed on each rough blade shape 301*a* prior to removing the material 302*c*, 303*c*, 302*d*, 303*d*, 302*e*, 303*e* associated with the next rough blade shape 301*a*. An edge (e.g., edge 111 and/or 112 of FIG. 1) of the blade attachment portion 310*b* may form an angle 346*b* with respect to a blade bottom edge (e.g., bottom 109 of FIG. 1) of approximately 21.2° to encourage material to be cut to move toward the blade end 347*b*. The angle 346*b* may be between approximately 15° and approximately 25°. As can be seen in FIG. 3A, each rough blade shape 301*a* may include a blade body portion 305*a*, 305*b*, 305*c*, 305*d* and a blade attachment portion 310*a*, 310*b*, 310*c*, 310*d*. Blade securing holes 315*c*, 320*c*, 325*c*, 315*d*, 320*d*, 325*d* may be formed in each rough blade shape 301*a* (block 380*d*). The blade securing holes 315*c*, 320*c*, 325*c*, 315*d*, 320*d*, 325*d*** may be formed by any suitable method, such as laser cutting, water jet cutting, machining, drilling, stamp shearing, etc.

Figure 3B:
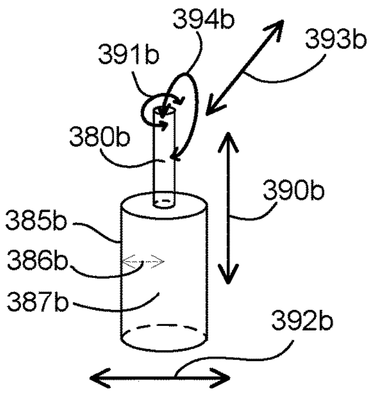
FIG. 3B depicts an example blade edge grinding and honing drum apparatus.

With further reference to FIGS. 3A-3D, a first blade cutting edge **335*d* and a second blade cutting edge 345*d* may be formed in each rough blade shape 301*a* (block 385*d*). The first blade cutting edge 335*d* may be formed prior to the second blade cutting edge 345*d* or the first blade cutting edge 335*d* and the second blade cutting edge 345*d* may be formed simultaneously. The first blade cutting edge 335*d* and the second blade cutting edge 345*d* may be formed using a blade edge grinding and honing drum 385*b*, a blade edge grinding and honing wheel 385*c* or any other suitable method. The blade edge grinding and honing drum 385*b* may have a radius 386*b* that is substantially the same as the desired cutting edge radius 304*a*. The blade edge grinding and honing drum 385*b* may include a grinding surface 387*b* of any desired roughness and hardness to form the sharpened surface portion (e.g., sharpened surface portion 335*d*, 345*d*). As depicted in FIG. 3B, the blade edge grinding and honing drum 385*b* may include a spindle 380*b* for attaching the blade edge grinding and honing drum 385*b* to an associated driving and actuating machine (not shown) to rotate the blade edge grinding and honing drum 385*b* or move the blade edge grinding and honing drum 385*b* in any combination of a x-direction 392*b*, a y-direction 390*b* and a z-direction 393*b* relative to the strip of blade material 300*a* to produce a sharpened portion 135, 145, 135*b*1, 135*b*2. Alternatively, the strip of blade material 300*a* may be oriented and moved in any one of or a combination of a x-direction 392*b*, a y-direction 390*b* and a z-direction 393*b* relative to the blade edge grinding and honing drum 385*b* to produce a sharpened portion 135, 145, 135*b*1, 135*b*2. The blade edge grinding and honing drum 385*b* may be rotated about a central axis 391*b* to produce a grinding and honing motion of the grinding surface 387*b* relative first blade cutting edge 335*d* and the second blade cutting edge 345*d*. The blade edge grinding and honing drum 385*b* rotated into position around a pivot axis 394*b* when a corresponding rough blade shape 305*c* is moved into an appropriate position relative the blade edge grinding and honing drum 385*b***.

Figure 3C:
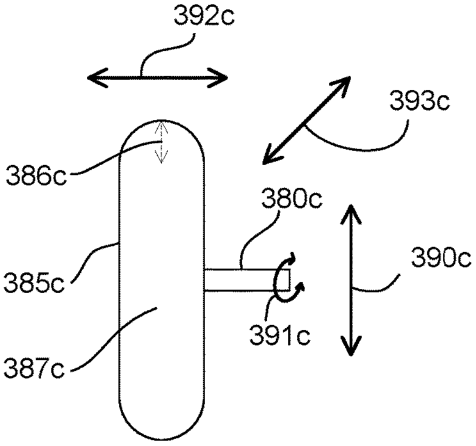
FIG. 3C depicts an example blade edge grinding and honing wheel.
Figure 3D:
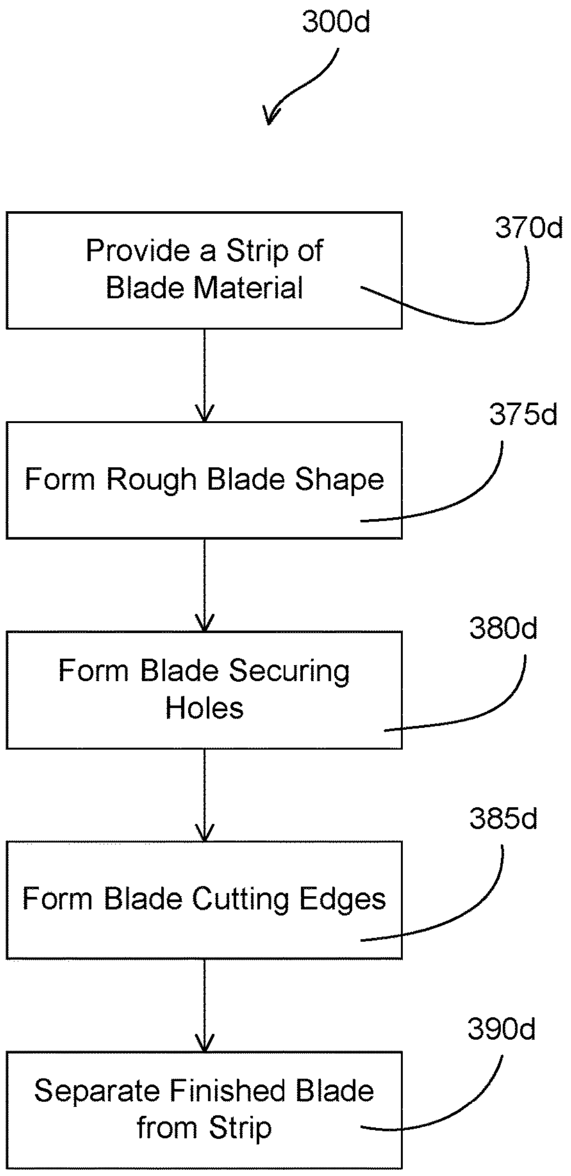
FIG. 3D depicts an example flow diagram for a method of manufacturing the safety utility blade of FIG. 3A.
Figure 3E:
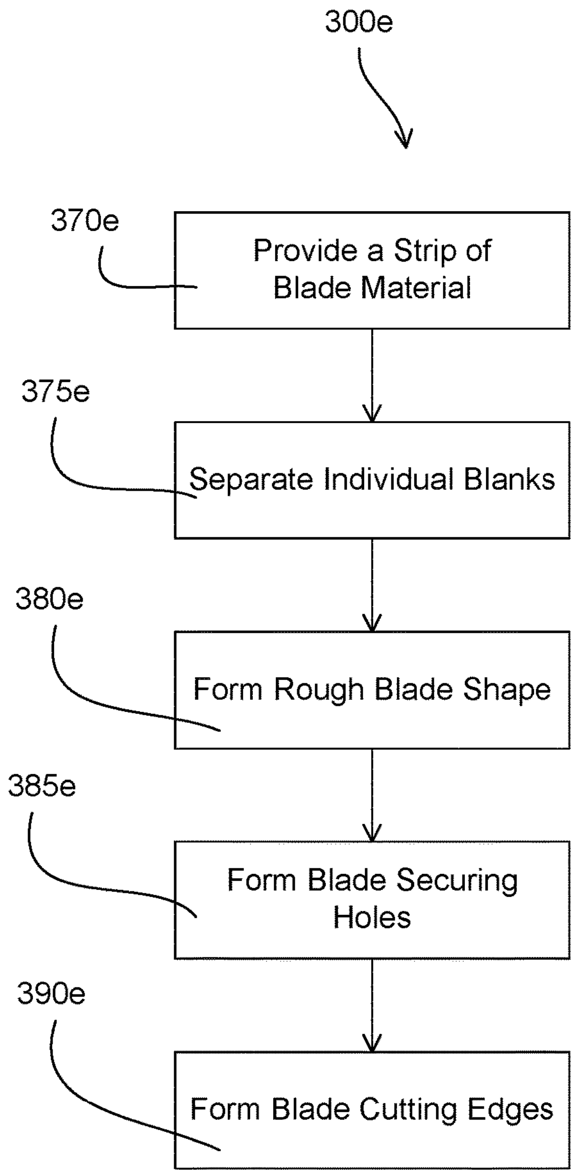
FIG. 3E depicts an example flow diagram for a method of manufacturing the safety utility blade of FIGS. 4A-4D.
Figure 4A:
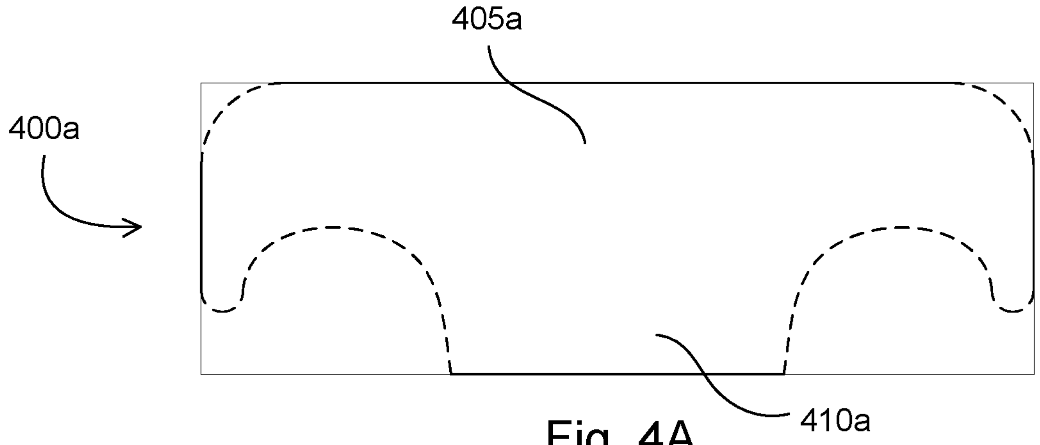
FIGS. 4A-4D depict a second example progression of manufacturing the safety utility blade of FIGS. 1A, 1B and 2.
Figure 4B:
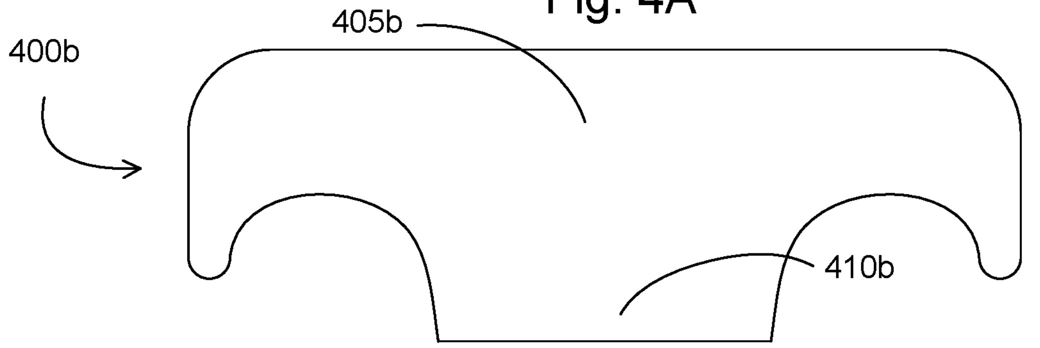
Figure 4C:
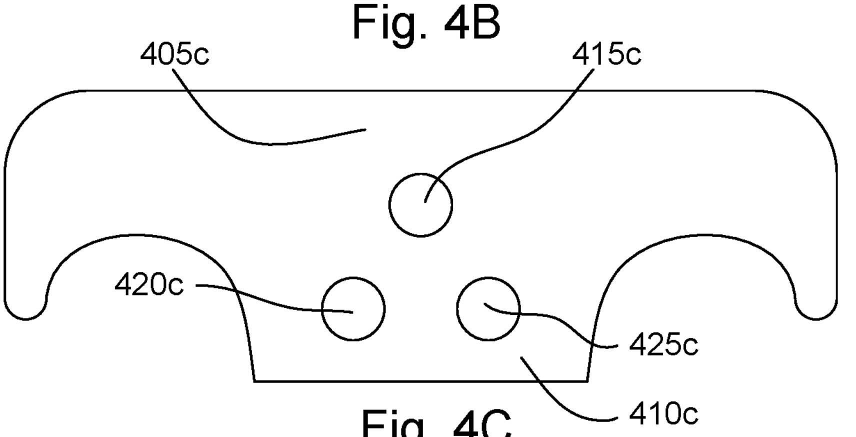
Figure 4D:
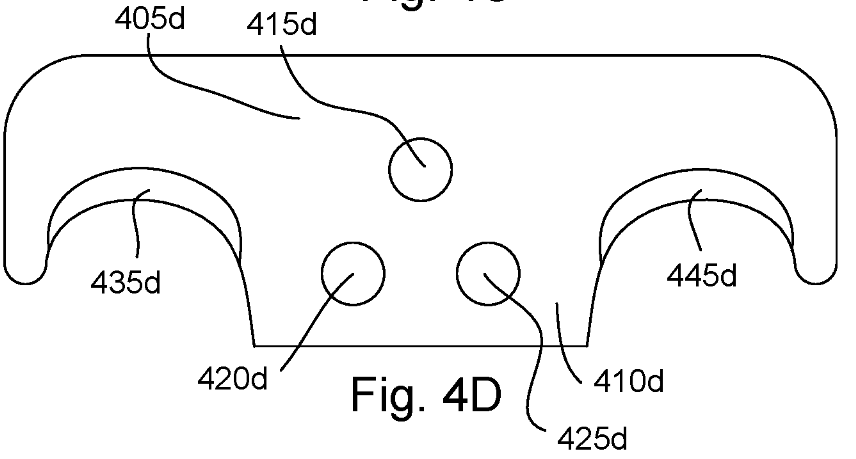

Alternatively, the first blade cutting edge **335*d* and the second blade cutting edge 345*d* may be formed using a blade edge grinding and honing wheel 385*c* or any other suitable method. The blade edge grinding and honing wheel 385*c* may have a radius 386*c* that is substantially the same as the desired cutting edge radius 304*a*. The blade edge grinding and honing wheel 385*c* may include a grinding surface 387*c* of any desired roughness and hardness to form the sharpened surface portion (e.g., sharpened surface portion 335*d*, 345*d*). As depicted in FIG. 3C, the blade edge grinding and honing wheel 385*c* may include a spindle 380*c* for attaching the blade edge grinding and honing wheel 385*c* to an associated driving and actuating machine (not shown) to rotate the blade edge grinding and honing wheel 385*c* and/or move the blade edge grinding and honing wheel 385*c* in any combination of a x-direction 392*c*, a y-direction 390*c* and a z-direction 393*c* relative to the strip of blade material 300*a* to produce a sharpened portion 135, 145, 135*b*1, 135*b*2. Alternatively, the strip of blade material 300*a* may be oriented and moved in any one of or a combination of a x-direction 392*c*, a y-direction 390*c* and a z-direction 393*c* relative to the blade edge grinding and honing wheel 385*c* to produce a sharpened portion 135, 145, 135*b*1, 135*b*2. The blade edge grinding and honing wheel 385*c* may be rotated about a central axis 391*c* to produce a grinding and honing motion of the grinding surface 387*c* relative first blade cutting edge 335*d* and the second blade cutting edge 345*d*. The blade edge grinding and honing wheel 385*c* rotated into position around a pivot axis 394*c* when a corresponding rough blade shape 305*c* is moved into an appropriate position relative the blade edge grinding and honing wheel 385*c***.

Once the blade securing holes **315*c*, 320*c*, 325*c* and the sharpened surface portions 335*d*, 345*d* are formed in a respective rough blade shape 301*a*, the finished safety utility blade 100** may be separated from the strip of blade material

300*a* (block 390*d*). Alternatively, with reference to FIGS. 3E and 4A-4D, a strip of blade material 300*a* may be provided (block 370*e*) and individual blade blanks 400*a* may be separated from the strip of blade material 300*a* (block 375*e*). Rough blade shapes 400*b* may be formed from the individual blade blanks 400*a* by laser cutting, machining, water jet cutting, stamp shearing or any other suitable technique (block 380*e*). The rough blade shapes may include a blade body portion 405*a*, 405*b*, 405*c*, 405*d* and a blade attachment portion 410*a*, 410*b*, 410*c*, 410*d*. Blade securing holes 415*c*, 420*c*, 425*c*, 415*d*, 420*d*, 425*d* may be formed in the rough blade shapes by any suitable method, such as laser cutting, water jet cutting, machining, drilling, stamp shearing, etc. (block 385*e*).

With further reference to FIGS. 3E and 4A-4D, a first blade cutting edge 435*d* and a second blade cutting edge 445*d* may be formed in each rough blade shape 400*a* (block 390*d*). The first blade cutting edge 435*d* may be formed prior to the second blade cutting edge 445*d* or the first blade cutting edge 435*d* and the second blade cutting edge 445*d* may be formed simultaneously. The first blade cutting edge 435*d* and the second blade cutting edge 445*d* may be formed using a blade edge grinding and honing drum 385*b*, a blade edge grinding and honing wheel 385*c* or any other suitable method. The blade edge grinding and honing drum 385*b* may have a radius 386*b* that is substantially the same as the desired cutting edge radius 304*a*. The blade edge grinding and honing drum 385*b* may include a grinding surface 387*b* of any desired roughness and hardness to form the sharpened surface portion (e.g., sharpened surface portion 435*d*, 445*d*). As depicted in FIG. 3B, the blade edge grinding and honing drum 385*b* may include a spindle 380*b* for attaching the blade edge grinding and honing drum 385*b* to an associated driving and actuating machine (not shown) to rotate the blade edge grinding and honing drum 385*b* or move the blade edge grinding and honing drum 385*b* in any combination of a x-direction 392*b*, a y-direction 390*b* and a z-direction 393*b* relative to the rough blade shape 400*b*. Alternatively, the rough blade shape 400*b* may be oriented and moved in any one of or a combination of a x-direction 392*b*, a y-direction 390*b* and a z-direction 393*b* relative to the blade edge grinding and honing drum 385*b*.

Alternatively, the first blade cutting edge 435*d* and the second blade cutting edge 445*d* may be formed using a blade edge grinding and honing wheel 385*c* or any other suitable method. The blade edge grinding and honing wheel 385*c* may have a radius 386*c* that is substantially the same as the desired cutting edge radius 304*a*. The blade edge grinding and honing wheel 385*c* may include a grinding surface 387*c* of any desired roughness and hardness to form the sharpened surface portion (e.g., sharpened surface portion 435*d*, 445*d*). As depicted in FIG. 3C, the blade edge grinding and honing wheel 385*c* may include a spindle 380*c* for attaching the blade edge grinding and honing wheel 385*c* to an associated driving and actuating machine (not shown) to rotate the blade edge grinding and honing wheel 385*c* and/or move the blade edge grinding and honing wheel 385*c* in any combination of a x-direction 392*c*, a y-direction 390*c* and a z-direction 393*c* relative to the rough blade shape 400*b*. Alternatively, the rough blade shape 400*b* may be oriented and moved in any one of or a combination of a x-direction 392*c*, a y-direction 390*c* and a z-direction 393*c* relative to the blade edge grinding and honing wheel 385*c*.

Whether the safety utility blade 100 is completed prior to separating the rough blade shapes 301*a* from the strip of blade material 300*a* or the safety utility blade 100 is completed after the individual blade blanks 400*a* are separated from a strip of blade material 300*a*, a series of grinding and honing drums 385*b* and/or grinding and honing wheels 385*c* may be used to form the sharpened surface portion 335*d*, 345*d*, 435*d*, 445*d*. Each grinding and honing drum 385*b* and/or grinding and honing wheel 385*c* in a series of grinding and honing drums 385*b* and/or grinding and honing wheels 385*c* may have a progressively finer and finer grinding and honing surface 387*b*, 387*c* relative to the preceding grinding and honing drum 385*b* and/or grinding and honing wheel 385*c* in the series.

Figure 5A:
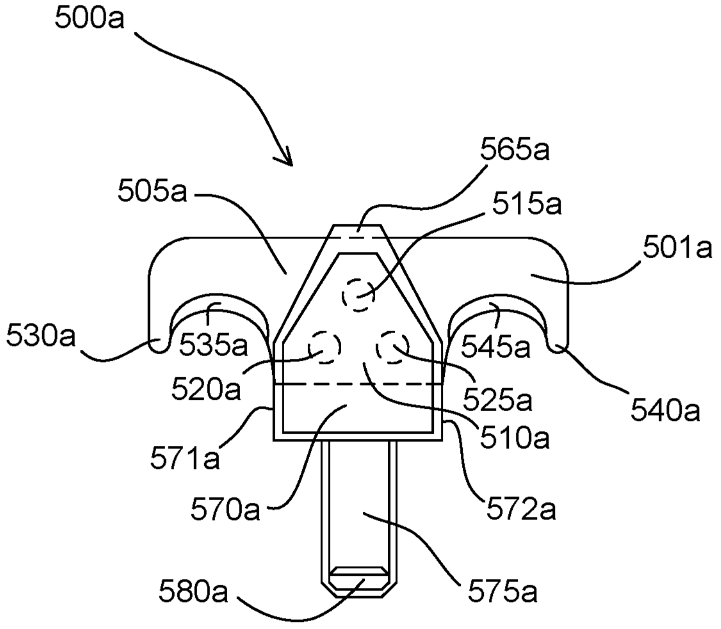
FIGS. 5A and 5B depict examples of safety cutter heads which include a safety utility blade of FIGS. 1*a*, 1*b*, 2, 3A and 4A-4D.

Turning to FIG. 5A, a safety cutting head 500*a* is depicted including a safety utility blade 501*a* attached to a handle adaptor 570*a*. The safety utility blade 501*a* may include a blade body portion 505*a*, an blade attachment portion 510*a*, blade securing holes 515*a*, 520*a*, 525*a*, a first sharpened portion 535*a*, a first blade shield 530*a*, a second sharpened portion 545*a* and a second blade shield 540*a*. The handle adaptor 570*a* may include a body portion 565*a* having a first side 571*a* and a second side 572*a*. As depicted in FIG. 5A, the width of the body portion 565*a* may be substantially equal the width of the blade attachment portion 510*a*. As also depicted in FIG. 5A, the body portion 565*a* may extend beyond the blade body portion 505*a*. The extension of the body portion 565*a* may cooperate with the securing holes 515*a*, 520*a*, 525*a* to secure the safety utility blade 501*a* to the handle adaptor 570*a*. For example, the handle adaptor may be made of a thermal plastic material and may be co-molded around the safety utility blade 501*a* such that the thermal plastic material penetrates through the blade securing holes 515*a*, 520*a*, 525*a* and form a mirror half of the body portion 565*a* on either side of the safety utility blade 501*a* to encapsulate the blade body portion 505*a* of the safety utility blade 501*a*. The handle adaptor 570*a* may include a handle engagement portion 575*a* with a handle securing mechanism 580*a* to secure the safety cutting head 500*a* to a corresponding handle (e.g., handle 685 of FIG. 6).

Figure 5B:
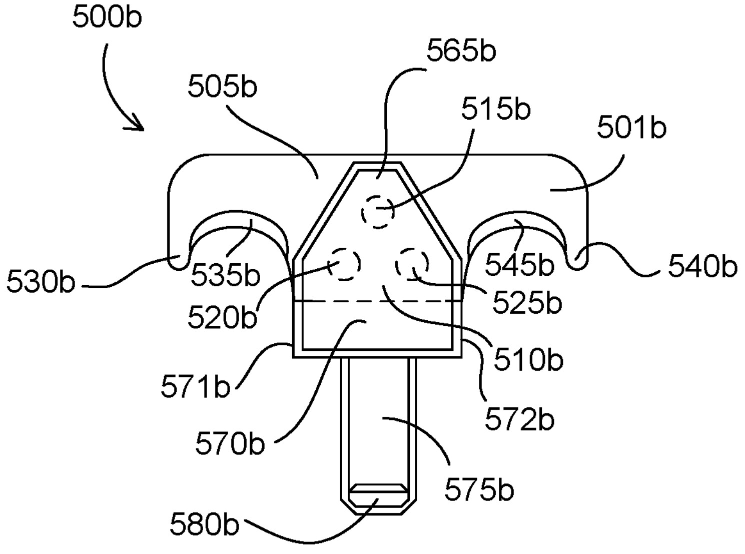

Turning to FIG. 5B, a safety cutting head 500*b* is depicted including a safety utility blade 501*b* attached to a handle adaptor 570*b*. The safety utility blade 501*b* may include a blade body portion 505*b*, an blade attachment portion 510*b*, blade securing holes 515*b*, 520*b*, 525*b*, a first sharpened portion 535*b*, a first blade shield 530*b*, a second sharpened portion 545*b* and a second blade shield 540*b*. The handle adaptor 570*b* may include a body portion 565*a* having a first side 571*b* and a second side 572*b*. As depicted in FIG. 5A, the width of the body portion 565*b* may be substantially equal the width of the blade attachment portion 510*b*. The body portion 565*b* may cooperate with the securing holes 515*b*, 520*b*, 525*b* to secure the safety utility blade 501*b* to the handle adaptor 570*b*. For example, the handle adaptor may be made of a thermal plastic material and may be co-molded around the safety utility blade 501*b* such that the thermal plastic material penetrates through the blade securing holes 515*b*, 520*b*, 525*b* and form a mirror half of the body portion 565*b* on either side of the safety utility blade 501*b* to encapsulate the blade body portion 505*b* of the safety utility blade 501*b*. The handle adaptor 570*b* may include a handle engagement portion 575*b* with a handle securing mechanism 580*b* to secure the safety cutting head 500*b* to a corresponding handle (e.g., handle 685 of FIG. 6). A first side 571*b* and a second side 572*b* of a handle adaptor 570*b* may cooperate with a body portion 565*b* to form a "clamshell" and fasteners, such as metal pins, may be included to cooperate with the securing holes 515*b*, 520*b*, 525*b* to replaceably secure a safety utility blade 100 within a safety cutting head 500*b*. When a clamshell structure is provided, a handle engagement portion 575*b* may be configured with two halves with each half being fixed to a respective side 571b, 572b of the handle adaptor 570b. When a safety utility blade 100 is placed within a clamshell structure and the clamshell structure is engaged with a handle 685, the safety utility blade 100 is secured within the clamshell structure of the safety cutting head 500b. The body portion 565b may be configured as a hinge mechanism within a clamshell structure and fasteners, such as metal pins, may be fixed to a respective side 571b, 572b of the handle adaptor 570b.

Figure 6:
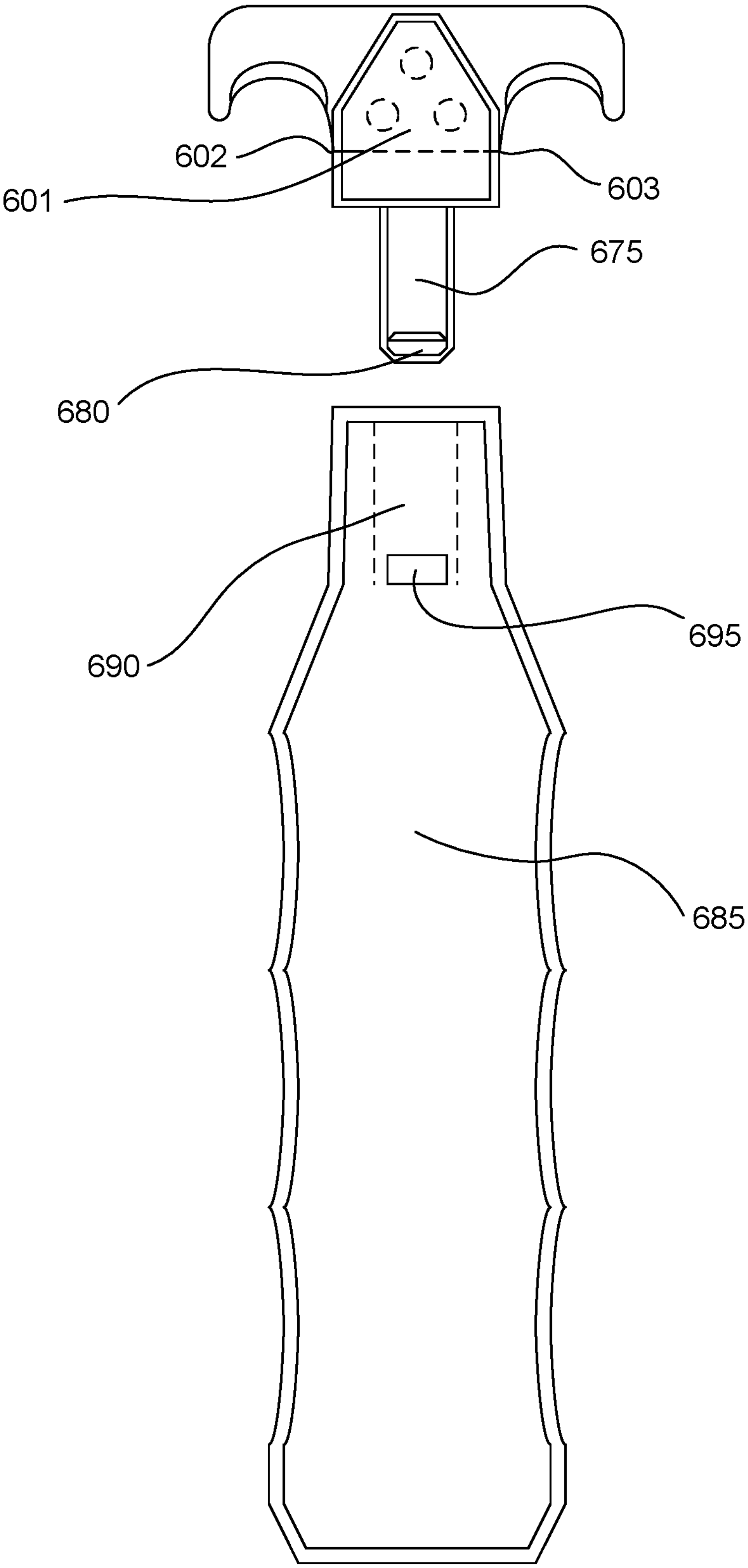
FIG. 6 depicts the safety cutter head of FIG. 5B proximate an associated safety utility knife handle.

Turning to FIG. 6, a safety cutting head 601 is depicted proximate an associated handle 685. The safety cutting head 601 may include a first body side 602 and a second body side 603. The safety cutting head 601 may include a handle engagement 675 having a handle securing mechanism 680. The handle 685 may include a cutting head engagement 690 having a cutting head securing mechanism 695.

Figure 7:
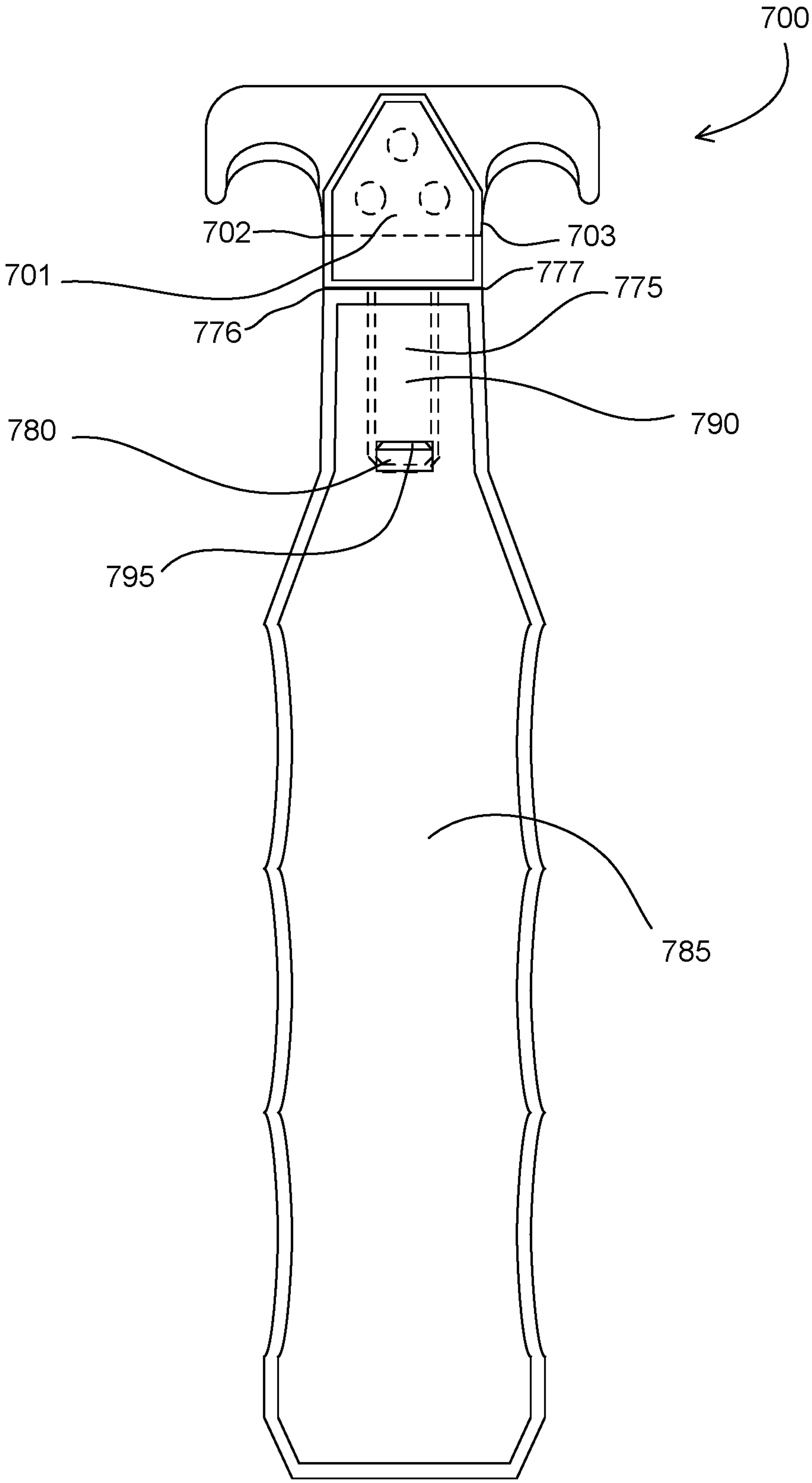
FIG. 7 depicts the safety cutter head of FIG. 5B engaged with an associated safety utility knife handle to form a safety utility knife assembly.

With reference now to FIG. 7, a safety utility knife assembly 700 is depicted including a safety cutting head 701 and a handle 785. The safety cutting head 701 may include a first side 702 that aligns with a first handle side 776 and a second side 703 that aligns with a second handle side 777 when the handle engagement 775 is secured to the cutting head engagement 790 via the handle securing mechanism 780 and the cutting head securing mechanism 795. A safety utility knife assembly 700 may be configured to store one or more additional safety cutting heads 701. For example, a second safety cutting head 701 may be secured to each end of the handle 785. Alternatively, the handle 785 may include a spare safety cutting head 701 retaining mechanism.

Turning now to FIGS. 8A-8H and 8J-8K, a safety utility knife assembly 800a, 800b, 800c, 800d, 800e, 800f, 800g, 800h, 800j, 800k is depicted including a blade 810a, 810b, 810c, 810e, 810f, 810g, 810k within a blade holder 805a, 805b, 805c, 805d, 805e, 805f, 805g, 805j, 805j, 805k inserted in a handle 815a, 815b, 815c, 815d, 815e, 815f, 815g, 815h, 815j, 815k. The blade holder 805a, 805b, 805c, 805d, 805e, 805f, 805g, 805j, 805j, 805k may include a handle engagement 806b, 806d, 806e, 806f, 806g, 806j a blade retaining offset 808e and blade retainer 807d, 807e. The handle 815a, 815b, 815c, 815d, 815e may include a blade holder engagement 816b, 816e, 816f that cooperates with the handle engagement 806b, 806d, 806e, 806g, 806j to secure the blade holder 805a, 805b, 805c, 805d, 805e, 805f, 805g, 805j, 805j, 805k within the handle 815a, 815b, 815c, 815d, 815e, 815f, 815g, 815h, 815j, 815k. The blade retaining offset 808e, a first blade retainer 807d, 807e, 807f, a second blade retainer 808f and a third blade retainer 809f cooperate with the handle 815a, 815b, 815c, 815d, 815e to secure the blade edge 812c, 812f proximate a blade retaining offset surface 811c, 811f. The safety utility knife assembly 800a, 800b, 800c, 800d, 800e, 800f, 800g, 800h, 800j, 800k may include a spare blade compartment to store unused blades 810a, 810b, 810c, 810e, 810f, 810g, 810k.

Figure 9E:
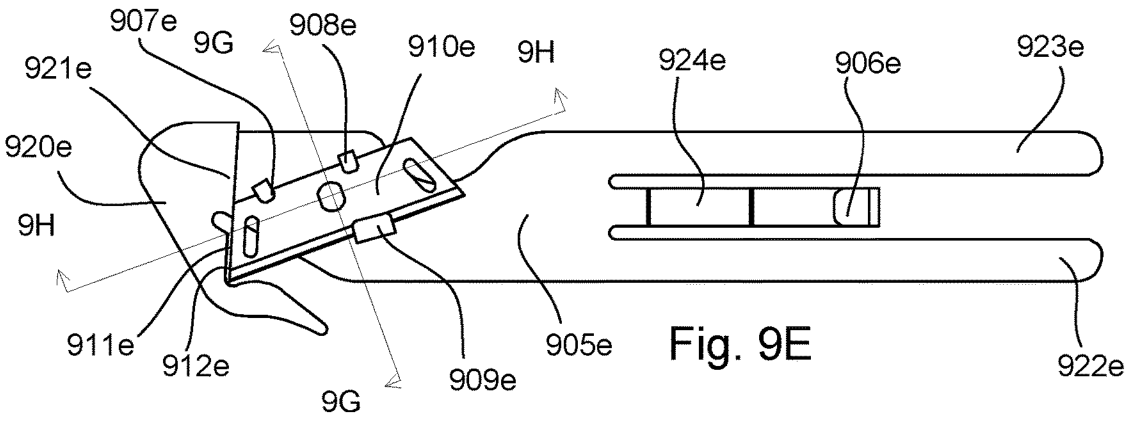
Figure 9F:
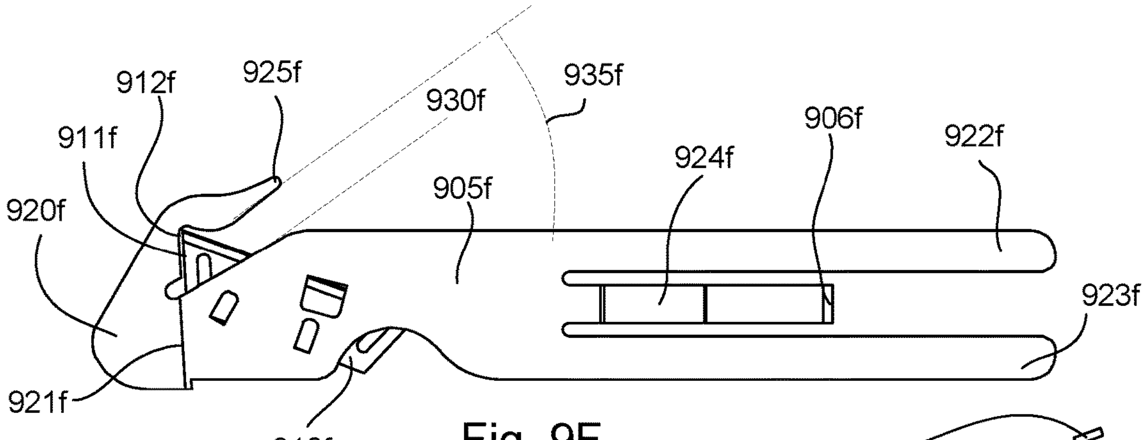
Figure 9G:
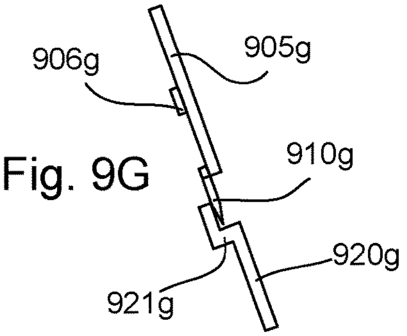
Figure 9H:
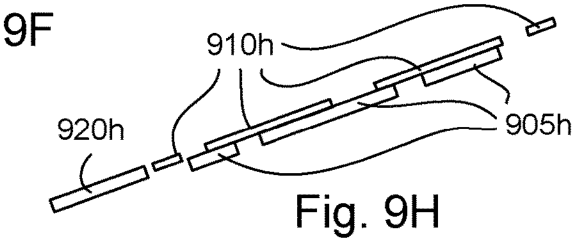
Figure 9J:
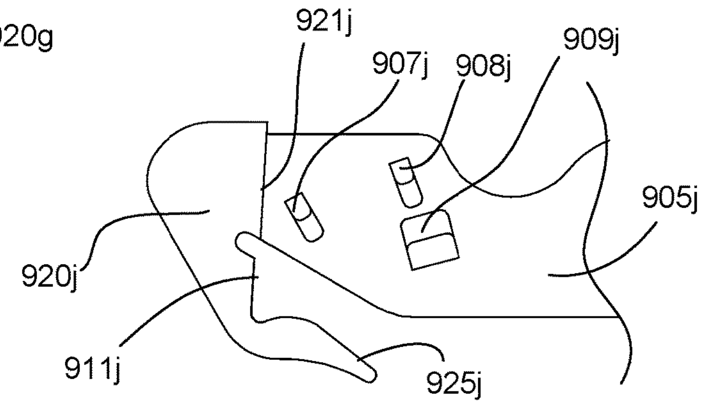

With reference to FIGS. 9A-9H and 9J a blade holder 905a, 905b, 905c, 905d, 905e, 905f, 905g, 905h, 905j is depicted including a blade edge 912b, 912e, 912f of blade 910a, 910b, 910c, 910d, 910e, 910f, 910g, 910h, 910j secured against a blade retaining offset surface 911b, 911e, 911f of the blade holder 905a, 905b, 905c, 905d, 905e, 905f, 905g, 905h, 905j by a first blade retainer 907a, 907b, 907c, 907e, 907j, a second blade retainer 908a, 908b, 908c, 908e, 908j and a third blade retainer 909a, 909b, 909c, 909e, 909j. A blade holder head 920a, 920b, 920c, 920d, 920e, d20f, 920g, 920h, 920j and blade shield 925a, 925b, 925f, 925j are offset from the blade holder 905a, 905b, 905c, 905d, 905e, 905f, 905g, 905h, 905j at offset surface 921a, 921b, 921c, 921e, 921f, 921g, 921j by a distance substantially equal to a thickness (e.g., thickness 106b of FIG. 1B) of the blade 910a, 910b, 910c, 910d, 910e, 910f, 910g, 910h, 910j. The blade holder 905a, 905b, 905c, 905d, 905e, 905f, 905g, 905h, 905j may include a first slide 922a, 922b, 922c, 922e, 922f and a second slide 923a, 923b, 923e, 923f that are received within a corresponding handle 815a, 815b, 815c, 815d, 815e, 815f, 815g, 815h, 815j, 815k and secured within the handle 815a, 815b, 815c, 815d, 815e, 815f, 815g, 815h, 815j, 815k with handle engagement mechanism 906a, 906b, 906c, 906d, 906e, 906f with biasing member 924a, 924b, 924c, 924e, 924f. As depicted in FIG. 9F, a blade throat 930f defines an angle 935f with respect to a longitudinal axis of the blade holder 905f of approximately 38°. The angle 935f may be between approximately 30° and approximately 45°. The blade throat 930f may define an angle 935f with respect to a longitudinal axis of the blade holder 905f between 25° and 50°. The blade throat 930f may be approximately 0.188 inches, thereby, the blade throat 930f limits exposure to the cutting edge of the blade 910f. The cutting edge of the blade 910f may define an angle (e.g., angle 813c of FIG. 8C) with respect to a longitudinal axis of the blade holder 905f of approximately 20°. The cutting edge of the blade 910f may define an angle 813c with respect to a longitudinal axis of the blade holder 905f between 15° and 25°.

Figure 10A:
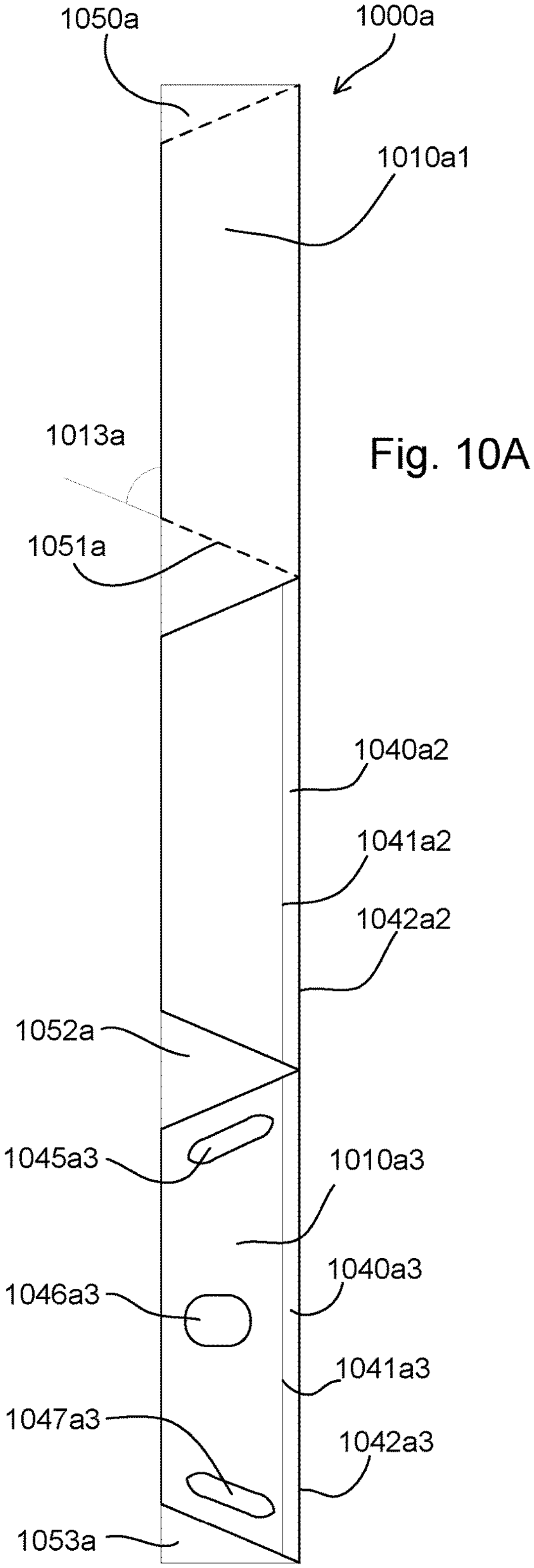
FIG. 10A depicts an example progression of manufacturing a blade for use in the safety utility knife assembly of FIGS. 9A-9H and 9J.
Figure 10B:
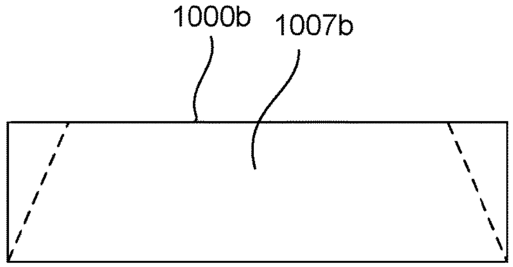
FIGS. 10B-10D depict a second example progression of manufacturing a blade for use in the safety utility knife assembly of FIGS. 9A-9H and 9J.
Figure 10C:
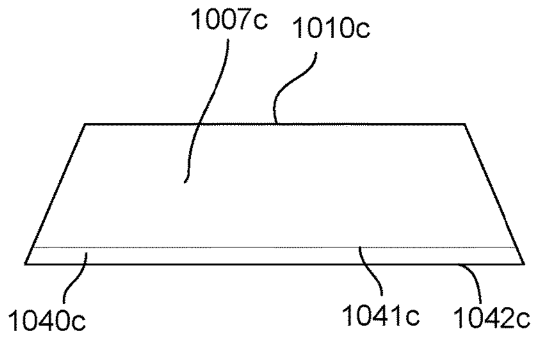
Figure 10D:
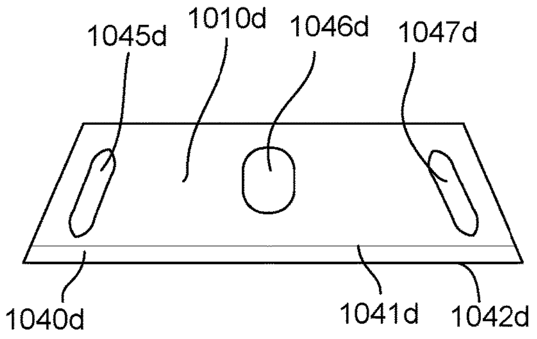
Figure 10E:
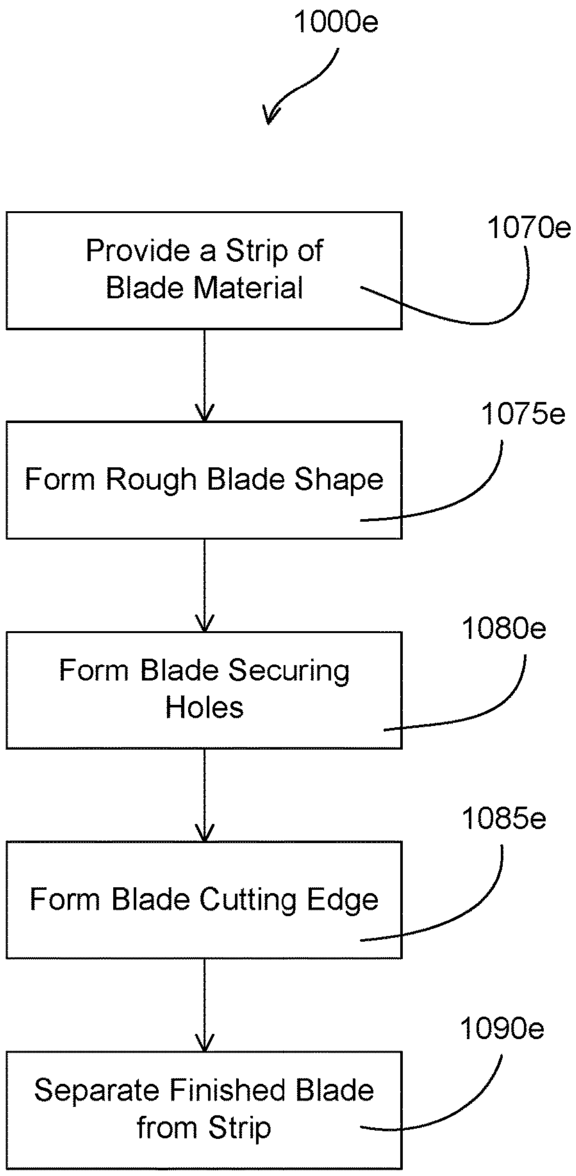
FIG. 10E depicts an example flow diagram for a method of manufacturing the safety blade of FIG. 10A.
Figure 10F:
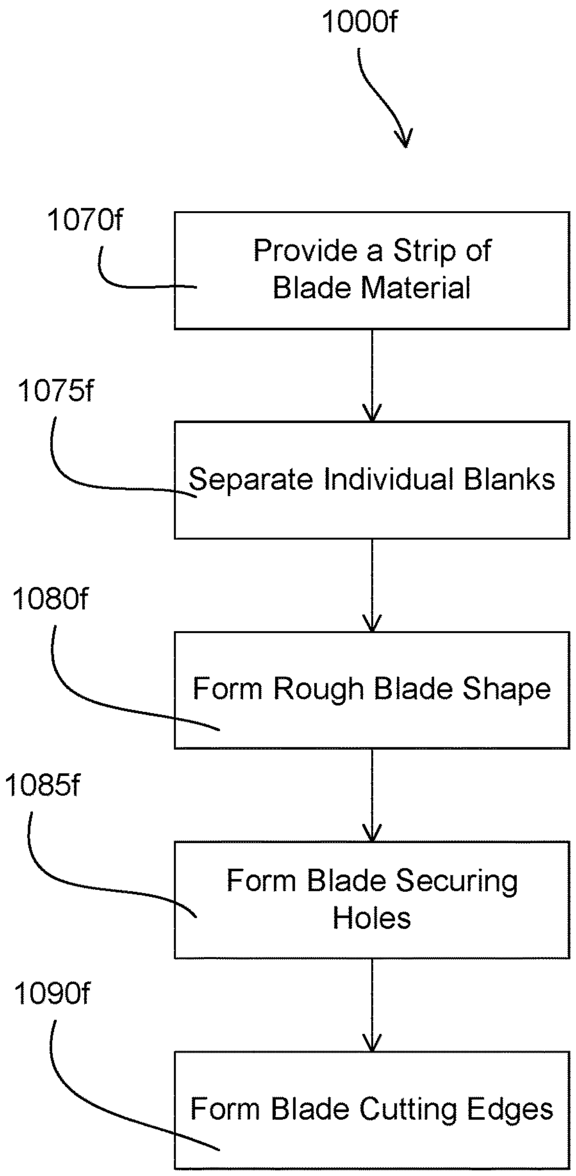
FIG. 10F depicts an example flow diagram for a method of manufacturing the safety blade of FIGS. 10B-10D.

Turning to FIGS. 10A and 10E, a method 1000e of manufacturing a blade 1010a3 for use in a safety utility knife assembly (e.g. safety utility knife assembly 800a of FIG. 8A) may include providing a strip of blade material 1000a (block 1070e). A rough blade shape 1010a1 may be formed by removing material 1050a (block 1075e). Blade securing holes 1045a3, 1046a3, 1047a3 may be formed in the rough blade shape 1010a1 by any suitable method, such as laser cutting, water jet cutting, machining, drilling, stamp shearing, etc. (block 1080e). A sharpened portion 1040a2, 1040a3 may be formed by any suitable method, such as those disclosed in U.S. Pat. Nos. 4,265,055, 5,842,387, 6,860,796 or 8,206,199, for example (block 1085e). The sharpened portion 1040a2, 1040a3 may define a shoulder 1041a2, 1041a3 and a cutting edge 1042a2, 1042a3. The blade 1010a3 may be separated from the strip of blade material 1000a by removing material 1052a, 1053a (block 1090e). A blade end 1051a may form an angle 1013a with respect to a linear edge of the strip of blade material 1000a of approximately 60°. The angle 1013a may be between approximately 55° and approximately 70°.

With reference now to FIGS. 10B-10D and 10F, a method 1000f of manufacturing a blade 1010d for use in a safety utility knife assembly (e.g. safety utility knife assembly 800a of FIG. 8A) may include providing a strip of blade material 1000a (block 1070f). Blade blanks 1000b may be formed from the strip of blade material 1000a (block 1075f). Rough blade shapes 1007b may be formed from the blade blanks 1000b (block 1080f). Blade securing holes 1045b, 1046b, 1047b may be formed in the rough blade shape 1000b by any suitable method, such as laser cutting, water jet cutting, machining, drilling, stamp shearing, etc. (block 1085f). A sharpened portion 1040c, 1040d may be formed by any suitable method, such as those disclosed in U.S. Pat. Nos. 4,265,055, 5,842,387, 6,860,796 or 8,206,199, for example (block 1090f). The sharpened portion 1040c, 1040d may define a shoulder 1041c, 1041d and a cutting edge 1042c, 1042c.

Figure 8A:
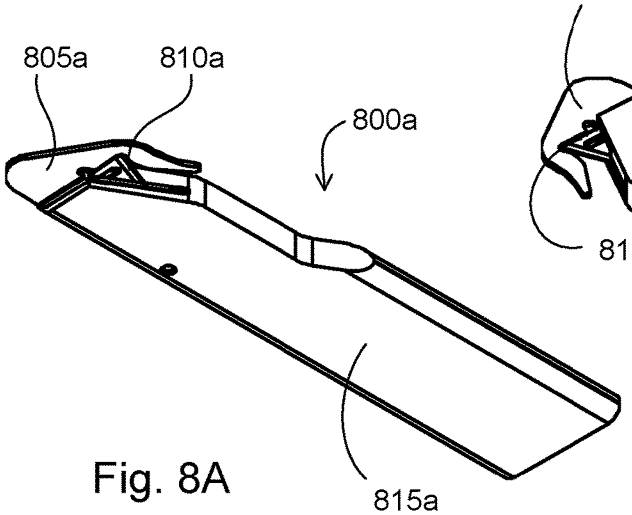
FIGS. 8A-8H and 8J-8K depict an example safety utility knife assembly.
Figure 8B:
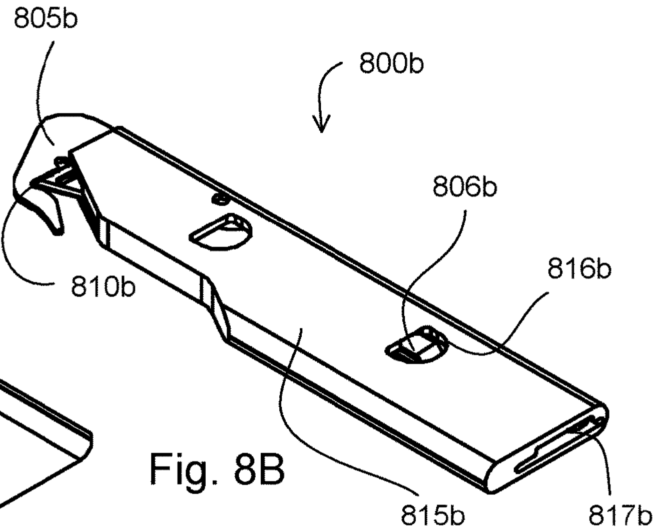
Figure 8C:
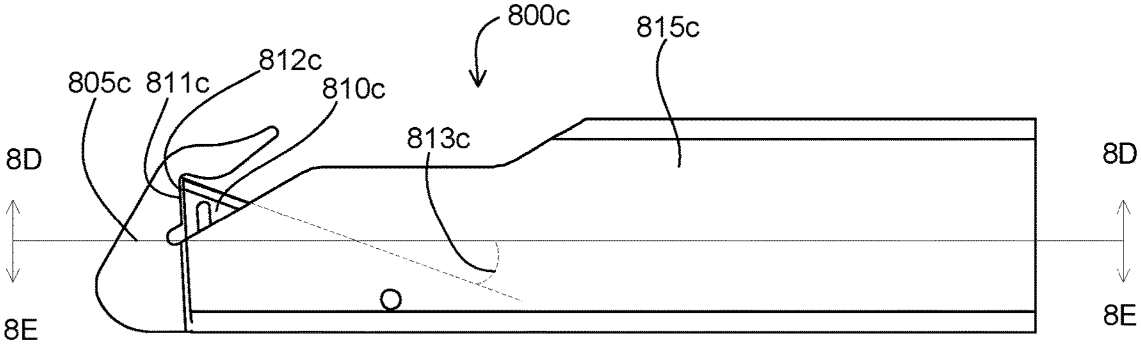
Figure 8D:
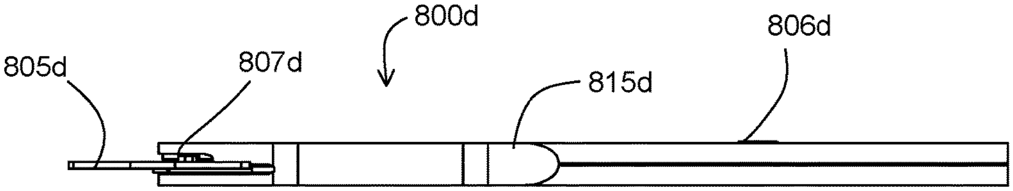
Figure 8E:
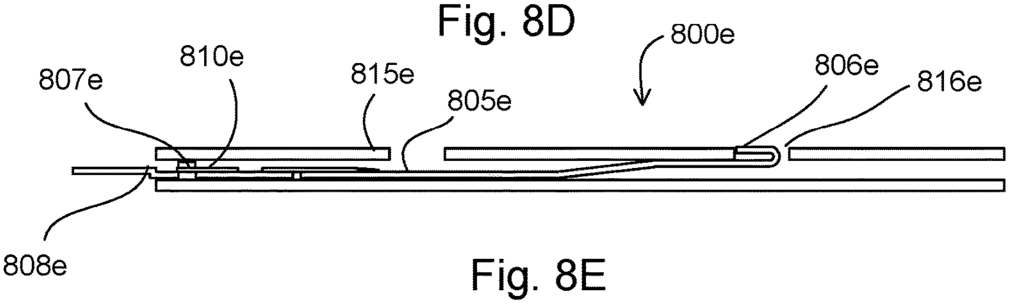
Figure 8F:
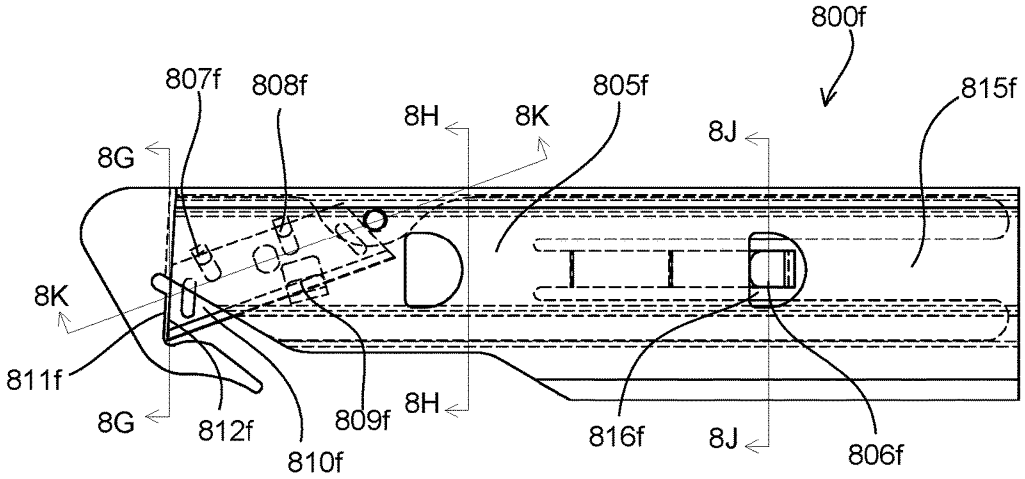
Figure 8G:
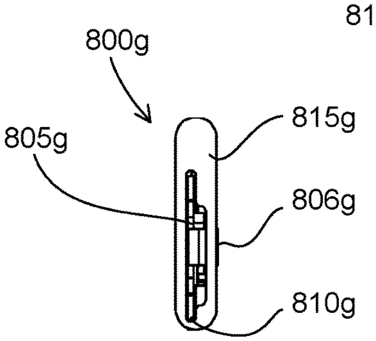
Figure 8H:
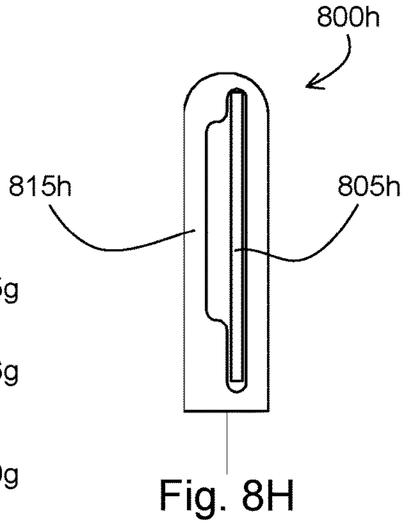
Figure 8J:
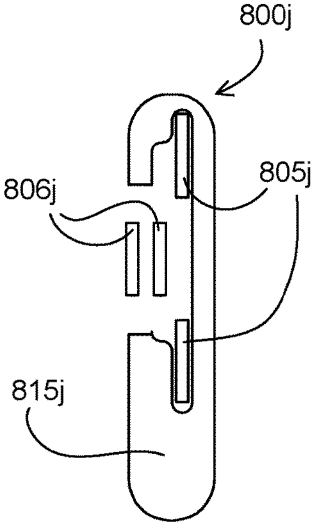
Figure 8K:
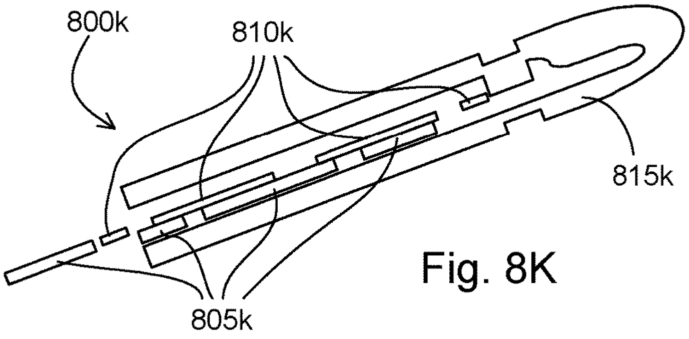
Figure 11:
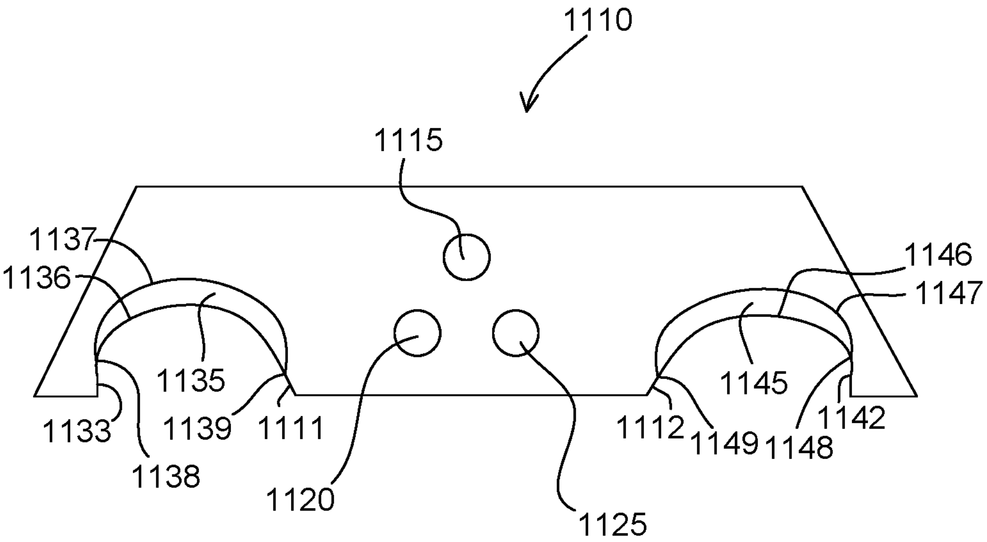
FIG. 11 depicts an example safety utility blade for use in a safety utility knife assembly as in FIGS. 9A-9H and 9J.

With reference to FIG. 11, a safety utility blade 1110 for use in the safety utility knife assembly 800a of FIG. 8A may have a body 1110a formed from a relatively thin and substantially flat material 1000a, such as ceramic, heat treated carbon steel, ceramic coated steel, stainless steel, Teflon coated material, etc. For example, the material 1000*a* may be approximately 0.025 inches thick. A blade blank (e.g. blade blank 1000*a*, 1000*b* of FIGS. 10A and 10B, respectively) may be 1.0964567 inches from a first end 1050*a* to a second end 1051*a* and 0.3917323 inches from a top side 1010*c* to a bottom side 1042*d*. The safety utility blade may include blade securing holes 1115, 1120, 1125. As described herein the blade securing holes 1115, 1120, 1125 may, at least in part, secure a safety utility blade 1110 to a safety utility knife cutting head (e.g., safety utility knife cutting head 920*j* of FIG. 9J). The safety utility blade 1110 may be formed from a suitable material 1000*a* for retaining a sharpened edge 1136, 1137, and, when that material 1000*a* is metal, the body 1110*a* preferably has a thickness 106*b* of at least 0.0156 inches and preferably not greater than about 0.0313 inches. What might be characterized as a "heavy-duty" safety utility blade 100 is approximately 0.025 inches thick, and the thickness 106*b* for what might be characterized as a "regular duty" safety utility blade 1110 is approximately 0.017 inches. The sharpened portion 1135, 1145 is approximately 0.0492 inches high.

With further reference to FIG. 11, the first sharpened portion 1135 of the safety utility blade 1110 may include a first shoulder 1137, a first cutting edge 1136, a first heal 1139 and a first toe 1138. The safety utility blade may include a first edge 1111 extending from the first heal 1139 to the bottom side. The safety utility blade 1110 may further include a first inner edge 1133 that extends from the first toe 1139 to the bottom side and may have a thickness that is greater than the first sharpened portion 1135 and less than or equal to the thickness 106*b* of the body 1005*a*. The first edge 1111 and the first inner edge 1133 may cooperate to limit access to the cutting edge 1136 while the safety utility blade 1110 is being used in the safety utility knife assembly 800*a*, while the safety utility blade 1110 is being inserted into the safety utility knife assembly 800*a*, while the safety utility blade 1110 is being removed from the safety utility knife assembly 800*a* and while the safety utility blade 1110 is being handled while removed from the safety utility knife assembly 800*a*.

With further reference to FIG. 11, the safety utility blade 1110 may include a second sharpened portion 1145 which may include a second shoulder 1147, a second cutting edge 1146, a second heal 1149 and a second toe 1148. The safety utility blade 1110, 110*b* may include a second edge 1112 extending from the second heal 1149 to the bottom side. The safety utility blade 1110 may further include a second inner edge 1143 that extends from the second toe 1149 to the bottom side and may have a thickness that is greater than the second sharpened portion 1145 and less than or equal to the thickness 106*b* of the body 1005*a*. As depicted in FIG. 1*b*, the cutting edge 136*b* may be defined by a third sharpened portion 135*b*1 extending from a third shoulder 137*b*1 and a fourth sharpened portion 135*b*2 extending from a fourth shoulder 137*b*2. It should be understood that either of the cutting edges 1136, 1146 may be formed similar to cutting edge 136*b*. The second edge 1112 and the second inner edge 1143 may cooperate to limit access to the cutting edge 1146 while the safety utility blade 1110 is being used in the safety utility knife assembly 800*a*, while the safety utility blade 1110 is being inserted into the safety utility knife assembly 800*a*, while the safety utility blade 1110 is being removed from the safety utility knife assembly 800*a* and while the safety utility blade 1110 is being handled while removed from the safety utility knife assembly 800*a*. A safety utility blade 1110 may be manufactured similar to the safety utility blade 100 as described with reference to FIGS. 3A-3E and 4A-4D.

The figures depict preferred embodiments of safety blades for use in utility knife assemblies, utility knife assemblies and methods of manufacturing. One skilled in the art will readily recognize from the corresponding written description that alternative embodiments of the structures and methods illustrated herein may be employed without departing from the principles described.

Upon reading this disclosure, those of skill in the art will appreciate still additional alternative structural and functional designs for safety blades for use in utility knife assemblies, utility knife assemblies and methods of manufacturing. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the apparatuses and methods disclosed herein without departing from the spirit and scope defined in the appended claims.

What is claimed is:

1. A safety cutter, comprising:

a blade;

a blade carrier comprising, a blade holder head at first end of the blade carrier, a first slide member extending from a second end of the blade carrier and terminating at a first slide member distal end, a second slide member extending from the second end of the blade carrier and terminating at a second slide member distal end, wherein the first slide member and the second slide member extend independently from the blade carrier, and a blade carrier release at the second end of the blade carrier, wherein the blade carrier release is a flexible member that is cantilevered between the first and second slide members and the blade carrier release is bent to be angled at an offset relative to a flat position of the first and second slide members; and a handle formed with a blade carrier securing aperture extending through a first side of the handle, wherein the blade carrier securing aperture is configured to receive a distal portion of the blade carrier release.

2. The safety cutter of claim 1, wherein the distal portion of the blade carrier release is formed as a hook having a distal end that extends toward the blade holder head.

3. The safety cutter of claim 2, wherein the hook of the blade carrier release reversibly engages with the handle by extending over an edge of the blade carrier securing aperture.

4. The safety cutter of claim 1, wherein a cutting edge of the blade extends at an obtuse angle relative to a central axis of the handle and the blade holder head includes a blade throat configured to limit access to a cutting edge of the blade, an opening to the blade throat being oriented open toward the second end of the blade carrier.

5. The safety cutter of claim 1, wherein a cutting edge of the cutting blade extends at an obtuse angle relative to a central axis of the handle.

6. The safety cutter of claim 1, wherein the first slide member distal end and the second slide member distal end are separated by a gap having a width greater than or equal to a width of the blade carrier release.

7. The safety cutter of claim 1, wherein the handle is a cover configured to slide over the blade carrier.

* * * * *